US010763692B2

(12) United States Patent
Pelletier et al.

(10) Patent No.: US 10,763,692 B2
(45) Date of Patent: Sep. 1, 2020

(54) METHOD AND APPARATUS FOR CONTROLLING THE POWER SUPPLY FROM AN ELECTRIC VEHICLE TO A DWELLING OR TO AN AC POWER DISTRIBUTION NETWORK

(71) Applicant: Systemex-Energies International Inc., Warrens (BB)

(72) Inventors: Marc-Antoine Pelletier, Georgeville (CA); Iréné Normandin, Sherbrooke (CA); Simon Jasmin, Montreal (CA)

(73) Assignee: Systemex-Energies International Inc., Warrens (BB)

( * ) Notice: Subject to any disclaimer, the term of this patent is extended or adjusted under 35 U.S.C. 154(b) by 592 days.

(21) Appl. No.: 14/910,643

(22) PCT Filed: Aug. 6, 2014

(86) PCT No.: PCT/IB2014/002094
§ 371 (c)(1),
(2) Date: Feb. 5, 2016

(87) PCT Pub. No.: WO2015/019184
PCT Pub. Date: Feb. 12, 2015

(65) Prior Publication Data
US 2016/0178678 A1    Jun. 23, 2016

Related U.S. Application Data

(60) Provisional application No. 61/862,726, filed on Aug. 6, 2013.

(51) Int. Cl.
*G01R 21/133*    (2006.01)
*G01R 1/36*    (2006.01)
(Continued)

(52) U.S. Cl.
CPC .............. *H02J 9/061* (2013.01); *B60L 53/63* (2019.02); *B60L 53/65* (2019.02); *B60L 53/665* (2019.02);
(Continued)

(58) Field of Classification Search
CPC ........ B60L 53/63; B60L 53/65; B60L 53/665; B60L 55/00; B60L 58/12; G01R 21/1333;
(Continued)

(56) References Cited

U.S. PATENT DOCUMENTS 8,996,183 B2 * 3/2015 Forbes, Jr. ............. G06Q 10/00
  700/291
9,698,616 B2 * 7/2017 Mohagheghi ......... H02J 7/0063
(Continued)

FOREIGN PATENT DOCUMENTS

CA    2778345 A1    8/2012
CA    2809896 A1    5/2013

OTHER PUBLICATIONS

International Search Report—PCT/IB2014/003090—dated Jun. 15, 2015.
(Continued)

*Primary Examiner* — Abdelmoniem I Elamin
(74) *Attorney, Agent, or Firm* — Banner & Witcoff, Ltd.

(57) ABSTRACT

A method for managing the operation of an AC power distribution network to which connect a plurality of electric vehicles, at random times and at random locations to receive electrical energy for charging. The AC power distribution network is characterized by a dynamic state of balance between power generation and load, and it has an operating reserve which is a supplemental power generation capacity available to the AC power distribution network. The method includes the step of forecasting a power-supply contribution that would be available to the AC power distribution net-
(Continued)

work from the electric vehicles connected to the AC power distribution network in the event the AC power distribution network experiences a state of imbalance resulting from a power-generation deficit. The method further includes adjusting the magnitude of the operating reserve on the basis of the forecasting.

5 Claims, 18 Drawing Sheets

(51) Int. Cl.

| | | |
|---|---|---|
| *G05B 15/02* | (2006.01) | |
| *G05F 1/66* | (2006.01) | |
| *G06Q 20/08* | (2012.01) | |
| *H02J 9/06* | (2006.01) | |
| *G01R 31/367* | (2019.01) | |
| *H02J 3/32* | (2006.01) | |
| *H02J 3/14* | (2006.01) | |
| *H02J 3/00* | (2006.01) | |
| *H02J 13/00* | (2006.01) | |
| *G06Q 10/04* | (2012.01) | |
| *B60L 53/65* | (2019.01) | |
| *B60L 53/66* | (2019.01) | |
| *B60L 55/00* | (2019.01) | |
| *B60L 53/63* | (2019.01) | |
| *B60L 58/12* | (2019.01) | |
| *H02J 3/38* | (2006.01) | |
| *H02J 7/00* | (2006.01) | |

(52) U.S. Cl.
CPC ............... *B60L 55/00* (2019.02); *B60L 58/12* (2019.02); *G01R 21/1333* (2013.01); *G01R 31/367* (2019.01); *G05B 15/02* (2013.01); *G05F 1/66* (2013.01); *G06Q 10/04* (2013.01); *G06Q 20/085* (2013.01); *H02J 3/008* (2013.01); *H02J 3/14* (2013.01); *H02J 3/32* (2013.01); *H02J 3/383* (2013.01); *H02J 3/386* (2013.01); *H02J 13/0075* (2013.01); *H02J 13/0079* (2013.01); *H02J 3/003* (2020.01); *H02J 7/0013* (2013.01); *Y02B 70/3225* (2013.01); *Y02B 90/2653* (2013.01); *Y02E 60/721* (2013.01); *Y02T 10/7005* (2013.01); *Y02T 10/705* (2013.01); *Y02T 10/7044* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 20/222* (2013.01); *Y04S 20/224* (2013.01); *Y04S 30/14* (2013.01); *Y04S 40/126* (2013.01); *Y04S 50/10* (2013.01)

(58) Field of Classification Search
CPC ......... G01R 31/367; G05B 15/02; G05F 1/66; G06Q 10/04; G06Q 20/085; H02J 13/0075; H02J 13/0079; H02J 3/003; H02J 3/008; H02J 3/14; H02J 3/32; H02J 3/383; H02J 3/386; H02J 7/0013; H02J 9/061; Y02B 70/3225; Y02B 90/2653; Y02E 60/721; Y02T 10/7005; Y02T 10/7044; Y02T 10/705; Y02T 10/7055; Y02T 10/7072; Y02T 90/121; Y02T 90/128; Y02T 90/14; Y02T 90/163; Y02T 90/169; Y04S 10/126; Y04S 20/222; Y04S 20/224; Y04S 30/14; Y04S 40/126; Y04S 50/10

See application file for complete search history.

(56) References Cited

U.S. PATENT DOCUMENTS

| | | | |
|---|---|---|---|
| 9,960,637 B2 * | 5/2018 | Sanders | H02J 3/381 |
| 2007/0222294 A1 | 9/2007 | Tsukida et al. | |
| 2008/0281663 A1 * | 11/2008 | Hakim | B60L 53/665 705/7.25 |
| 2010/0038966 A1 | 2/2010 | Espeut, Jr. | |
| 2011/0084664 A1 | 4/2011 | White et al. | |
| 2011/0172837 A1 * | 7/2011 | Forbes, Jr. | G06Q 10/00 700/291 |
| 2011/0202418 A1 * | 8/2011 | Kempton | B60L 53/665 705/26.1 |
| 2011/0204720 A1 | 8/2011 | Ruiz et al. | |
| 2012/0323396 A1 | 12/2012 | Shelton et al. | |
| 2013/0110260 A1 | 5/2013 | Carpinteri et al. | |
| 2013/0173075 A1 | 7/2013 | Mitsumoto et al. | |
| 2013/0173331 A1 * | 7/2013 | Mohagheghi | B60L 11/1838 705/7.25 |
| 2014/0225564 A1 * | 8/2014 | North | G05D 1/0027 320/109 |
| 2014/0285154 A1 * | 9/2014 | Mohagheghi | B60L 11/1842 320/127 |
| 2014/0365025 A1 * | 12/2014 | Forbes, Jr. | G06Q 10/00 700/295 |
| 2015/0160672 A1 * | 6/2015 | Hakim | B60L 53/665 700/291 |
| 2016/0370806 A1 * | 12/2016 | North | B60L 53/665 |
| 2019/0041886 A1 * | 2/2019 | Hakim | B60L 53/65 |

OTHER PUBLICATIONS

International Search Report—PCT/IB2014/002094—dated Jun. 11, 2015.
Partial International Search Report—PCT/IB2014/002094—dated Apr. 1, 2015.

* cited by examiner

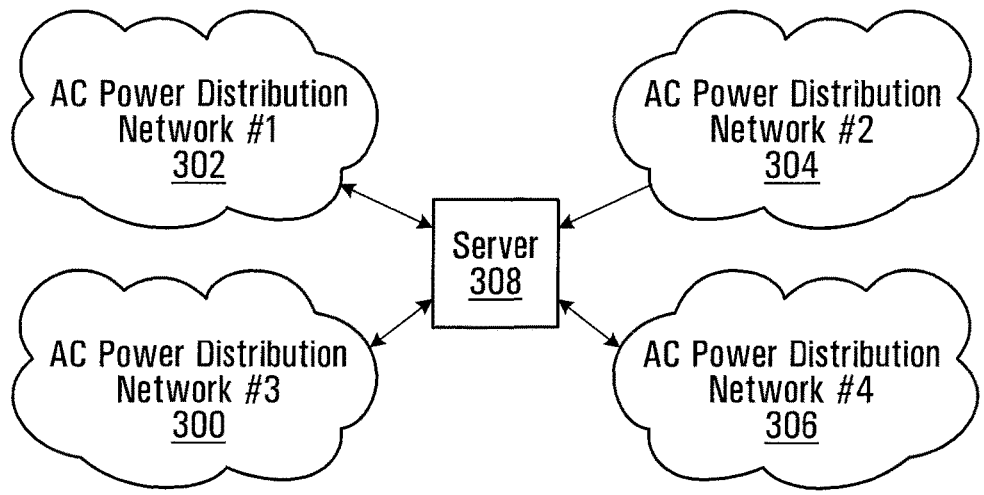
FIG. 18
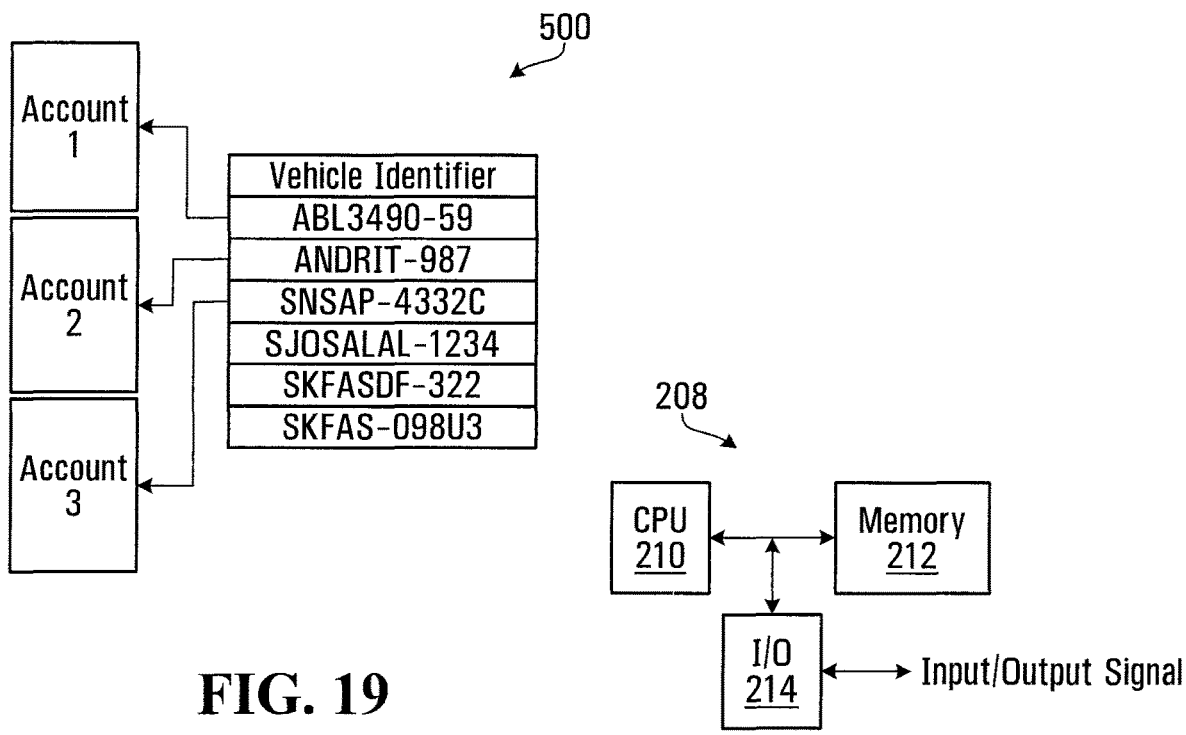
FIG. 19
FIG. 20

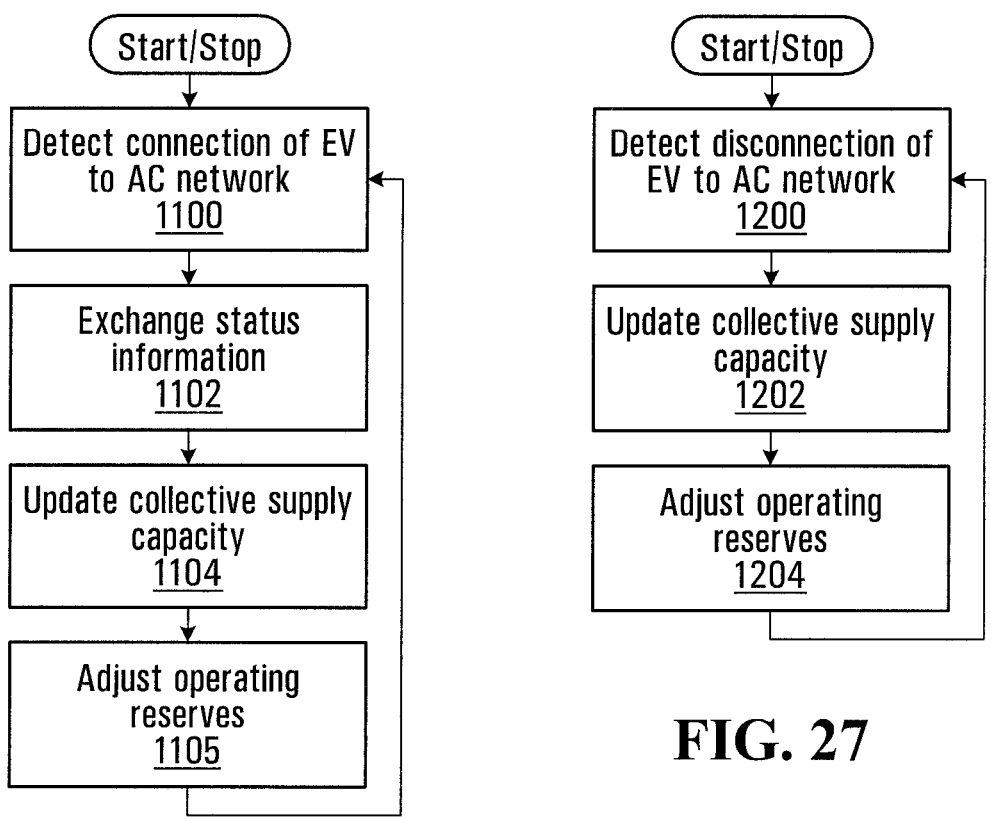

METHOD AND APPARATUS FOR CONTROLLING THE POWER SUPPLY FROM AN ELECTRIC VEHICLE TO A DWELLING OR TO AN AC POWER DISTRIBUTION NETWORK

CROSS-REFERENCE TO RELATED APPLICATIONS

The present application is a U.S. National Phase filing of International Application No. PCT/IB2014/002094 filed Aug. 6, 2014 entitled "Method and Apparatus for Controlling the Power Supply from an Electric Vehicle to a Dwelling or to an AC Power Distribution Network" and designating the United States of America and claiming priority to Ser. No. 61/862,726 filed Aug. 6, 2013. This application claims the benefit of the above-identified applications which are incorporated by reference herein in their entireties.

FIELD OF THE INVENTION

The invention relates to devices and methods for controlling the reverse supply of power from an electric vehicle to a dwelling or local industrial installation or to the AC power distribution network.

BACKGROUND

An electric vehicle has an electric supply capability, which is used for propulsion. The main battery of the electric vehicle constitutes the electric supply capability. Alternatively, an electrical generator that is driven by an internal combustion engine to supply electrical energy to the drive motor of the vehicle, either alone or in combination with the main battery, can provide supplemental electrical supply capability. A fuel cell is yet another example of an electrical supply capability option.

The main battery has a storage capacity that typically ranges from a few kWh to over a hundredth of kWh. The capacity is such that it can meet the electrical power consumption needs of a single family home for many hours even days. In addition, the electrical supply capability can be used to supply the AC power distribution network when the network requires it, namely when it is overloaded or experiences frequency instability.

In light of the above, there is a need to improve the interaction between an electric vehicle and the electrical distribution system of the dwelling when the vehicle supplies electrical energy to the dwelling or between the electric vehicle and the AC power distribution network when the electric vehicle assists the AC power distribution network in the case of high demand or a sudden imbalance between power generation and load.

In addition there is also a need to for techniques to allow an AC power distribution network to determine how much supply of electrical energy is available from electric vehicles that are currently connected to the AC power distribution network at any given time and on which the AC power distribution network can rely in case of overload or a power generation deficit.

Yet, there is a need for management of credits to electrical vehicle owners when they provide services to the AC power distribution network to support the network in the case of overload or a power generation deficit.

SUMMARY OF THE INVENTION

As embodied and broadly described herein, the invention provides a method for managing the operation of an AC power distribution network to which connect a plurality of electrical vehicles, at random times and at random locations to receive electrical energy for charging. The AC power distribution network is characterized by a dynamic state of balance between power generation and load and it has an operating reserve which is a supplemental power generation capacity available to the AC power distribution network. The method includes the step of forecasting a power supply contribution that would be available to the AC power distribution network from the electrical vehicles connected to the AC power distribution network in the event the AC power distribution network experiences a state of imbalance resulting from a power generation deficit. The method further includes adjusting the magnitude of the operating reserve on the basis of the forecasting.

As embodied and broadly described herein, the invention further includes a method for estimating a quantity of electrical energy that is available for injection in an AC power distribution network from a multiplicity of electrical storage devices, at least a subset of the multiplicity of electrical storage devices being mobile and connecting to the AC power distribution network at random times and at random locations to receive electrical energy for charging and disconnecting from the AC power distribution network at random times. The AC power distribution network being characterized by a dynamic state of balance between power generation and load. The method including monitoring connection events, a connection event occurring when a mobile electrical storage device connects to the AC power distribution network for receiving electrical energy. The method further includes computing on the basis of the monitored connection events an estimate of the electrical energy that would be available for injection in the AC power distribution network when the AC power distribution network is in a state of imbalance resulting from a power generation deficit.

As embodied and broadly described herein the invention further provides a method for allocating credits for injection of electricity into an AC power distribution network from electrical vehicles connected to the AC power distribution network, the AC power distribution network being characterized by a dynamic state of balance between power generation and load, the electrical vehicles being enabled to supply electricity to the AC power distribution network when the AC power distribution network is in a state of imbalance resulting from a power generation deficit. The method comprising detecting connections of electrical vehicles to the AC power distribution network through which electricity is supplied to the electrical vehicles for recharging and identifying for the electric vehicles at the detected connections, user accounts. The method further includes computing a credit for the individual electric vehicles at the detected connections for the supply of electricity to the AC power distribution network occurring when the AC power distribution network is in a state of imbalance and posting the credits to the respective user account.

As embodied and broadly described herein, the invention further provides a method for managing the operation of an AC power distribution network that supplies a plurality of domestic electrical equipment units that are controlled by respective power control devices. The AC power distribution network is characterized by a dynamic state of balance between power generation and load, the power control devices reducing an electrical consumption of the respective domestic electrical equipment units when a characteristic of the electrical energy supplied by the AC power distribution network indicates that the AC power distribution network is in a state of imbalance as a result of a power generation deficit. The AC power distribution network having an operating reserve which is a supplemental power generation capacity available to the AC power distribution network. The method including forecasting a degree of load receding that would arise in the event the AC power distribution network falls in a state of imbalance as a result of a power generation deficit and adjusting the magnitude of the operating reserve at least in part on the basis of the forecasting.

BRIEF DESCRIPTION OF THE DRAWINGS

FIG. 18 is a block diagram illustrating multiple AC power distribution networks associated with different public utility companies and a roaming server for managing roaming credit/charges;

FIG. 19 illustrates the structure of a table stored in the roaming server of FIG. 18, linking identifiers of electric vehicles or batteries with user accounts;

FIG. 20 is a block diagram of a computing platform for executing software to perform a management function;

FIG. 26 is a flowchart of a process performed by the server arrangement shown in FIG. 16 to update the collective supply capacity when an electric vehicle connects to the AC power distribution network for charging;

FIG. 27 is a flowchart of a process performed by the server arrangement shown in FIG. 16 to update the collective supply capacity when an electric vehicle connected to AC power distribution network is disconnected.

DETAILED DESCRIPTION

Figure 1:
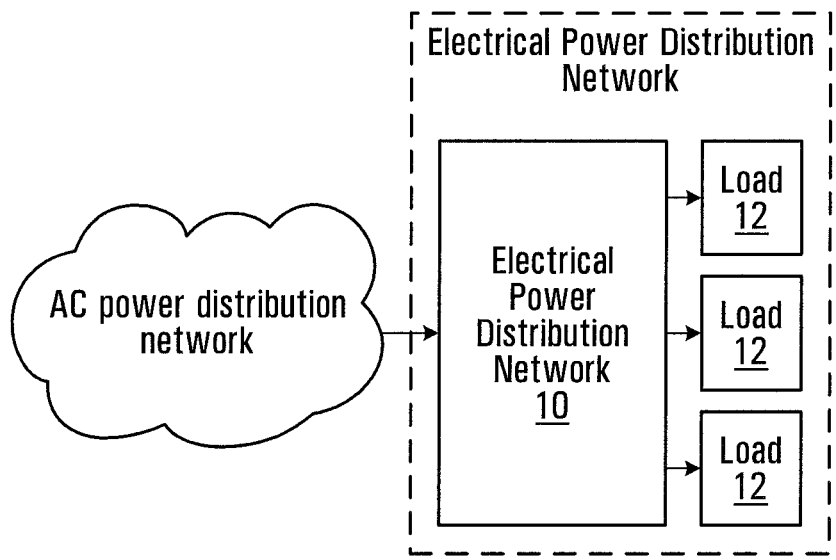
FIG. 1 is a block diagram illustrating an electrical power distribution panel of a dwelling or an industrial facility and that connects to an AC power distribution network.

FIG. 1 is a block diagram illustrating the electrical connection between an AC power distribution network and a dwelling or an industrial facility. The dwelling or industrial facility has an electrical power distribution panel 10 that receives electrical power from the AC power distribution network and distributes the electrical power over subsidiary circuits to individual loads 12. While not shown in the drawings, each circuit would be provided with a protection device against over-currents, such as a fuse or a circuit breaker.

One of the loads shown in FIG. 1 is an electrical vehicle that is charging its battery. The electrical vehicle can be a Battery Electric Vehicle (BEV) which has a battery as a sole energy source. Alternatively the electrical vehicle can be a hybrid vehicle that, in addition to the battery is provided with a supplemental energy source, such as in internal combustion engine that drives an electrical generator, which generates electric current to drive the electric motor of the vehicle.

Note that one of the loads 12 can be a battery, which is not used for propulsion. In such case the battery is stationary and is provided to supply the dwelling with electricity when there is a power failure.

Figure 2:
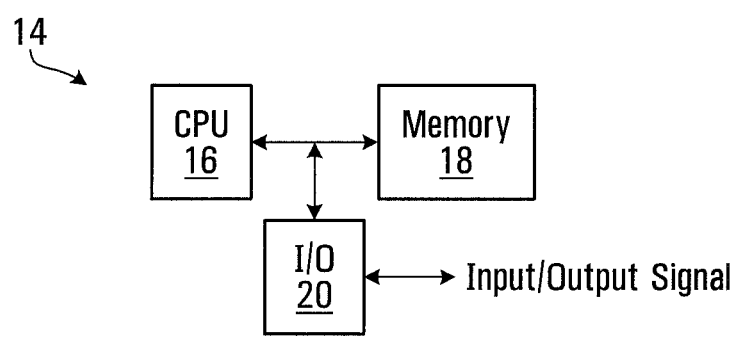
FIG. 2 is a block diagram of control module of the power distribution panel.

The electrical power distribution panel 10 is provided with a control module 14 shown in FIG. 2 to manage the power flow between the electrical power distribution panel and the electrical vehicle or battery. The management function is such that if there is an actual power failure or an impending power failure the electrical vehicle or battery provides an electrical power generation capacity to supply the loads in the dwelling or industrial installation normally supplied from the AC power distribution network. The management function can also supply electrical power to the AC power distribution network, to support it, particularly when the AC power distribution network is overloaded and/or experiences a generation deficit, which manifests itself by a frequency variation.

The control module 14 is essentially a computer platform that executes software. The software implements the management logic based on input signals received by the control module 14. More specifically, the control module 14 has a CPU 16 that communicates with a memory 18 via a data bus. The memory 18 is encoded with the software which is executed by the CPU 16. An I/O 20 acts as an interface. Input signals to be processed by the software are received at the I/O 20 while output signals generated as a result of the software execution are released from the I/O 20.

The input/output signals include the following:

1. Frequency information on the AC power supply. The frequency information can be derived from the power supply connection of the electrical distribution panel to the AC power distribution network;

2. State of the AC power distribution network. This signal indicates whether the AC power distribution network supplies electrical power to the electrical power distribution panel or fails to do so. In practice the state of the AC power distribution network and the frequency information can be combined in a single signal; if there is no frequency information one can assume the AC power distribution network has failed. On the other hand, if there is frequency, one can assume that electrical power is being supplied by the AC power distribution network, even when an under-frequency condition exists;

3. Handshaking/control signals with the electric vehicle/battery. The handshaking/control signals include information that is conveyed from the electric vehicle about the capability of the electric vehicle to supply electrical energy, to the dwelling or industrial facility, the AC power distribution network or both and signals to enable/disable the energy transfer. More specifically, the handshaking/control signals convey the following information:

(a) Whether the vehicle authorized to be operated as an electrical energy source. This is a setting allowing the vehicle owner to enable or disable the energy source function of the electric vehicle;

(b) The electrical generation capacity that is available. For example, when the electrical vehicle is a BEV, in other words it has an electrical battery only, the handshaking signals include the state of charge of the battery that allows the control module 14 to compute the amount of electrical energy the battery can provide. If the battery is fully charged it can supply the electrical distribution panel longer than if it is 50% charged. Note that a setting can be provided allowing limiting the amount of electrical energy made available for supplying the electrical distribution panel 10. For instance, the setting allows the driver of the vehicle to limit the amount of electrical energy to back flow to the electrical distribution panel 10 to a certain percentage of the overall capacity of the battery. When the electrical vehicle includes a power source other than the battery that produces electricity, such as an internal combustion engine driving an electrical generator or a fuel cell, the handshaking signals include information whether this additional power source is available and the extent to which it can be used for supplying the electrical power distribution panel 10. As in the case of a BEV vehicle, settings can be provided in the electrical vehicle allowing the owner to enable or disable the operation of the power source other than the battery, for supplying the electrical power distribution panel 10, or to limit its operation, in terms of kW/h, time, or amount of fuel consumed.

(c) An identifier of the electrical vehicle/battery or vehicle owner which can be used to provide a credit to the account of the vehicle owner for electrical energy supplied to the AC power distribution network. This point will be discussed later in more detail.

(d) Control signals to enable or disable the electrical power flow from the electrical vehicle/battery to the electrical power distribution panel 10. The control signals include a signal to allow the battery of the vehicle to start injecting electrical energy to the electrical power distribution panel and also a signal to stop the electrical energy injection. The control signals also include a signal to initiate electrical energy injection from the supplemental power source. When that supplemental power source is an internal combustion engine driving a generator, the control signal acts essentially as a remote start command, directing the vehicle to start the internal combustion engine and then direct the electrical power flow to the electrical distribution panel 10.

4. Information signals sent to a server of the company operating the AC power distribution network to notify the public utility company about the amount of electrical energy that was supplied to the AC power distribution network and also the source of that energy. This information is then collected and used to generate a credit to the account of the electrical vehicle owner. The amount of the credit will vary according to several factors, one being the source of the electrical energy that was used for power generation. For example, when the electricity was supplied by the stand-alone battery or the battery of the vehicle the credit can be computed on a basis of a first rate. In the case when the electrical power generation is derived from the operation of the internal combustion engine or fuel cell, the credit is computed on the basis of a second rate, higher than the first rate to compensate the owner for the cost of fuel and wear of the equipment. The information signals sent to the server can be sent in real time or on a deferred time basis. Real time exchange of information with the server is useful as it allows the server to acknowledge acceptance of the energy input to the AC power distribution network and confirm that a credit will be applied against the account of the electrical vehicle owner. There may be instances, where the operator of the AC power distribution network, even when the power distribution network is overloaded, may not desire to incur additional costs to purchase electrical energy from electrical vehicles.

Some form of negotiation or handshaking can be provided between the server and the control module 14, prior to initiating the electrical energy injection from the electrical vehicle to the AC power distribution network. In one example, the negotiation is triggered by the control module 14 based on a local observation of the state of the AC power distribution network; if there is a severe under frequency the control module 14 concludes that the AC power distribution network is in a generation deficit condition and sends a message to the server to request permission to start supplying electrical energy from the electrical vehicle. If the server sends an acknowledgement message accepting the electrical power input, the control module 14 triggers the operation.

Alternatively, the server can trigger the negotiation. When the AC power distribution network experiences a generation deficit, the server sends a signal to all the controllers 14 of the electrical distribution panels 10 of the dwellings supplied by the AC power distribution network to direct them to start injecting electrical power in the network. In response to this signal, the control modules 14 perform the necessary operations with the respective electrical vehicles to supply the network. In such instances, the server sends commands to the electrical distribution panel 10, which can include the following:

a) Initiate back flow of electrical power from the electric vehicle to the AC power distribution network. The command may also indicate:
   (a) Whether the back flow should be initiated immediately or after predetermined amount of time;
   (b) Duration of the back flow;
   (c) Rate of back flow in kW or in a relative fashion, such as low, medium or high.
b) Limit or stop the electric power consumption, in other words limit or stop the vehicle/battery charging process. The command may also indicate:
   (a) If the command is to limit electrical energy consumption, by how much in kW or percentage wise relative the current consumption.
   (b) Immediate or delayed implementation of the command and if delayed by how long.
   (c) Duration of the electrical consumption restrictions.
c) If the vehicle is equipped with a supplemental energy source, to remote start the supplemental energy source for power supply. The command may also indicate:
   (a) Immediate or delayed implementation of the command and if delayed by how long.
   (b) Duration of the power generation using the supplemental energy source.

Commands 1, 2 and 3 above can be used to perform certain management functions of the overall AC power distribution network, or certain sub-zones thereof. If collectively all or most distribution panels 10 respond to the commands, a grid-wide effect can be obtained. Examples of specific grid-wide functions that can be achieved with the commands include peak shaving, regulation up or down and production reserves. Also note that those commands are not necessarily sent to each distribution panel 10 connected to the AC power distribution network. A sub-set of panels 10 can receive the commands only, depending on local grid needs. Such localized control is performed when the server senses an anomaly currently occurring or impending in the sub-division of the AC power distribution network. To counterbalance the anomaly, the server determines what the corrective action should be and sends the command only to the panels 10 that are within the sub-division of the AC power distribution network.

5. Information signals exchanged with a display in the dwelling to notify the dwelling owner that the dwelling is being supplied with electricity from the electric vehicle. The information signals conveys information to the display showing the power supply status in other words, whether the dwelling is being supplied from the AC power distribution network or from the electric vehicle, in the latter case whether the electrical energy comes from the battery or is provided from the generator (internal combustion engine driving a generator or a fuel cell). When the battery is supplying the electrical energy, the display computes the time the supply will be available given the battery capacity and state of charge and the current consumption. The display can also be used as an interface to the controller module 14 allowing to set certain parameters, such as whether the electrical vehicle connected to the electrical distribution panel 10 has a battery only or has an additional power source that can produce electricity, and in the latter case if it can be made available for power generation.

Figure 3:
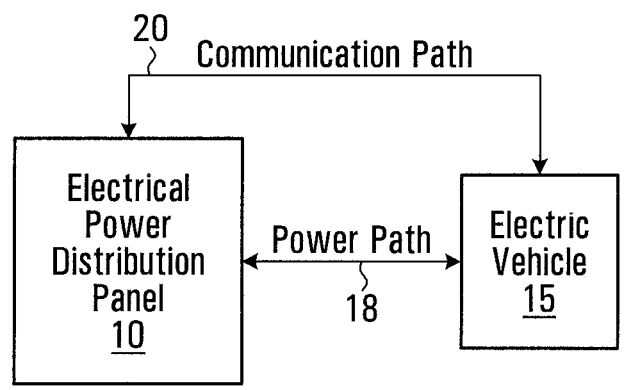
FIG. 3 is a block diagram illustrating the power connection and the signaling connection between the electrical power distribution panel and an electrical vehicle that is being charged by the power distribution panel.

FIG. 3 is a block diagram illustrating an example of implementation in which the controller module 14 is located in the electrical power distribution panel 10. In this form of implementation, there are two connections between the electrical power distribution panel 10 and the electric vehicle 15. One is the power path 16, which is identified as a double-headed arrow 18 to indicate that electrical power flow can reverse direction, in other words it can be supplied to the electric vehicle 15 to charge its battery or it can be supplied from the electric vehicle 15 to the electrical power distribution panel 10.

A communication path 20 is provided to exchange handshaking/control signals with the electric vehicle 15. Although shown as being separate from the power path 18, the communication path 20 can be integrated in the same medium as the power path 18. For example, the communication path 20 can use a high frequency signal superimposed on the power signal to communicate information. The high frequency signal is impressed by the electrical power distribution panel 10 and decoded at the electric vehicle to extract the relevant information. When the electric vehicle has information to transmit to the electrical power distribution panel, it impresses a high frequency signal which is then decoded by the controller module 14.

Alternatively, the communication path 20 can be physically separate from the power path 18. Both paths can be established when connecting to the vehicle by integrating them into the charge plug. Thus, the charge plug has power contacts that mate with respective power contacts on the vehicle and also signal contacts that mate with respective signal contacts on the vehicle. When the charging plug is connected to the electric vehicle 15 the power contacts and the signal contacts simultaneously engage to establish the power path 18 and the communication path 20.

In another possible variant, the communication path 20 is wireless. The electrical power distribution panel 10 is provided with a transmitter/receiver, which communicates with a transmitter/receiver in the electric vehicle 15. The wireless communication can be performed over a Wi-Fi connection or a cellular connection.

Figure 4:
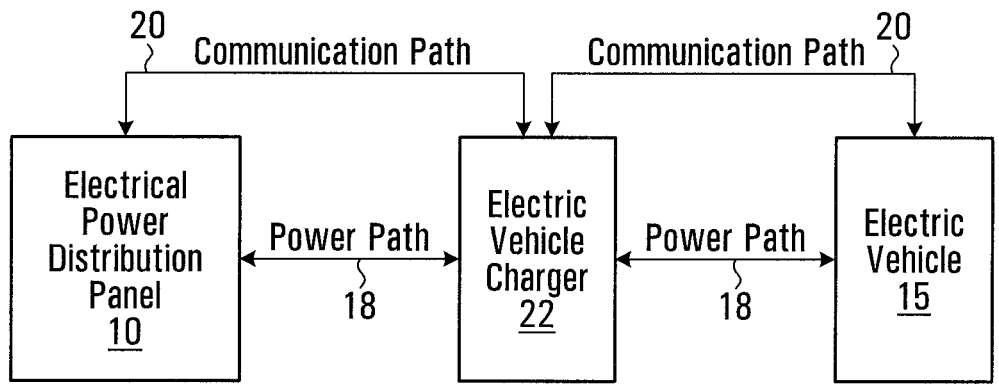
FIG. 4 is a variant of the arrangement shown in FIG. 3, illustrating an electrical vehicle charger that is an intermediate component between the electrical power distribution panel and the electric vehicle.
Figure 6:
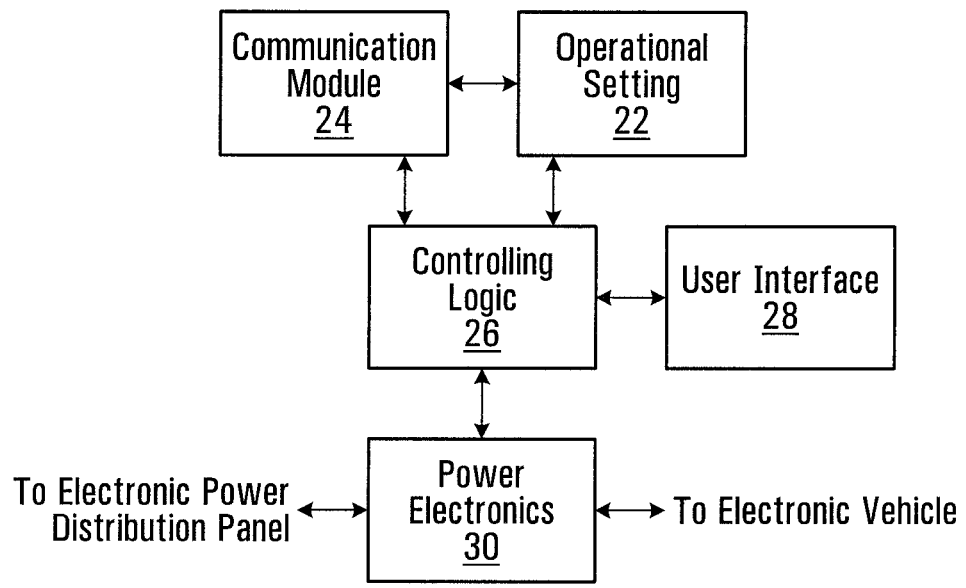
FIG. 6 is a block diagram of an electric vehicle charger.

FIG. 4 illustrates a variant. The power path 18 transits through an electric vehicle charger 22 to which the electric vehicle 15 connects when charging. This arrangement allows storing some of the operational settings in the electric vehicle charger, which simplifies the communication with the electric vehicle 15. A more detailed block diagram of the electrical vehicle charger 22 is shown at FIG. 6.

The electrical vehicle charger 22 has a communication module that manages the exchange of handshaking/control signals between the electrical power distribution panel 10 and the electrical vehicle 15. A controlling logic 26 manages the overall operation of the electrical vehicle charger 22. The controlling logic includes a computing platform similar to the one illustrated in FIG. 2 and which has a CPU executing software stored in a computer readable storage medium. The controlling logic 26 communicates with operational settings module 22 which stores in a machine readable storage medium data setting certain operational parameters. A user interface 28 allows a user, such as the owner of the electrical vehicle 15 to access a menu and make changes to the parameters. Examples of parameters will be discussed in detail later.

The controlling logic 26 sends control signals to power electronics 30 that manage the power flow between the electrical power distribution panel 10 and the electrical vehicle 15. The power electronics include power contacts to enable/disable the power flow. In addition, the power electronics include an inverter that generates AC power from DC power when the electric vehicle 15 feeds electric power to the electrical distribution panel 10 or to the AC power distribution grid. In a variant, the inverter can be installed in the electrical power distribution panel 10 or at any suitable location between the electrical vehicle 15 and the electrical power distribution panel 10.

Figure 7:
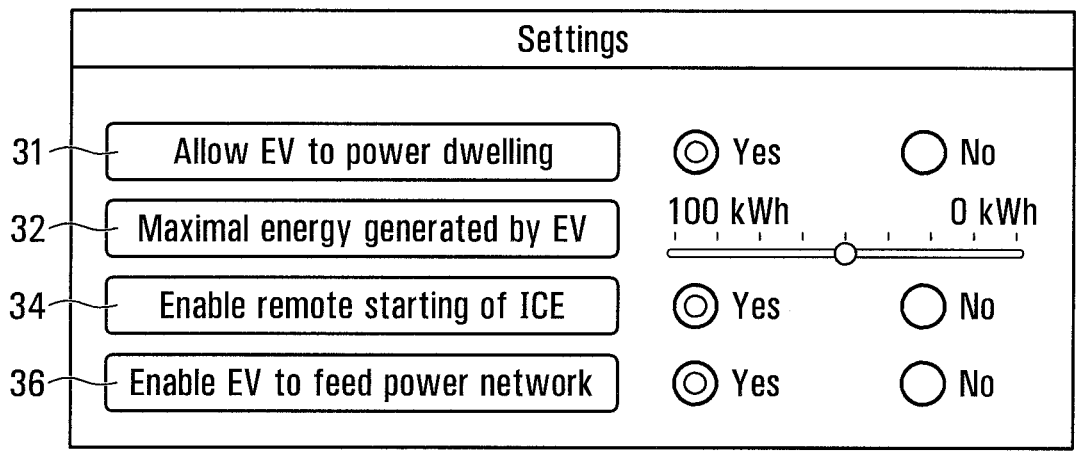
FIG. 7 is a representation of a user interface on a display device allowing to set system parameters.

FIG. 7 is an example of a display implementing the user interface 28 and allowing a user to set parameters of the electric vehicle charger 22. In the example shown, the user interface includes controls that can be manipulated by the user via a touch screen, however other forms of user input are possible such as by using a pointing device or keyboard.

The user interface 28 includes a first setting 31 allowing the user to enable or disable the electric vehicle to power the dwelling. In the example shown the user interface control includes radio buttons "yes" or "no" for this function. If the function is set to 'no' then the electric vehicle 15 will not feed any electricity to the electrical power distribution panel 10. When the electric vehicle is plugged to the electric vehicle charger 22 it will only be charged, however in the case of power failure no stored electrical energy will be supplied to the electrical power distribution panel 10 to power the dwelling or the industrial facility, as the case may be.

The first setting 31 is a master setting. If the setting is set to "no" then the remaining settings are grayed out and cannot be changed. On the other hand, if the first setting 31 is set to "yes" then the remaining settings are enabled and respond to user input.

The second setting 32 determines the maximal amount of electrical energy that can be drawn from the electric vehicle 15 for the benefit of the dwelling or the AC power distribution network. The intent is to avoid a situation where the electric vehicle 15 completely depletes its battery with the result that it can not be used. In those circumstances, it may be preferable to the user to maintain in the battery of the electric vehicle 15 a minimal charge to allow the vehicle 15 to be used.

In the example shown, the second setting 32 uses a slider control to set the maximal amount of electrical energy that can be drawn from the electric vehicle 15 measured in kWh. Alternatively, the slider can set the minimal state of charge of the battery of the electric vehicle 15. For example, the user may set the control such that the battery is not allowed to discharge less than 50% capacity. In a yet another embodiment, the parameter can be expressed in terms of available range of travel. In this case, even if a power failure occurs (assuming the battery was charged before the power failure) the vehicle 15 will be able to travel for the distance set.

The third setting 34 determines if the Internal Combustion Engine (ICE) in an electric vehicle, which uses it for electric power generation, can be remotely started to supply electric power to the electrical power distribution panel and/or to the AC power distribution network. In addition to what the user may find preferable from personal convenience perspective, there may be instances where remotely starting an ICE cannot be done for safety reasons. For example, if the electric vehicle is in a closed space, such as garage, the operation of the ICE will create carbon monoxide that can migrate in the dwelling and become a safety hazard. In other instances, the operation of the ICE may create noise that is objectionable. The setting 34 thus allows the user to take these factors into account and enable or disable automatic remote starting for electrical energy generation.

The fourth setting 36 determines if the electric vehicle is allowed to supply electrical power to the AC power distribution network. If this parameter is set to "no", then electrical power will be supplied only to the dwelling or industrial installation via the electrical power distribution panel 10.

Figures 8, 9:
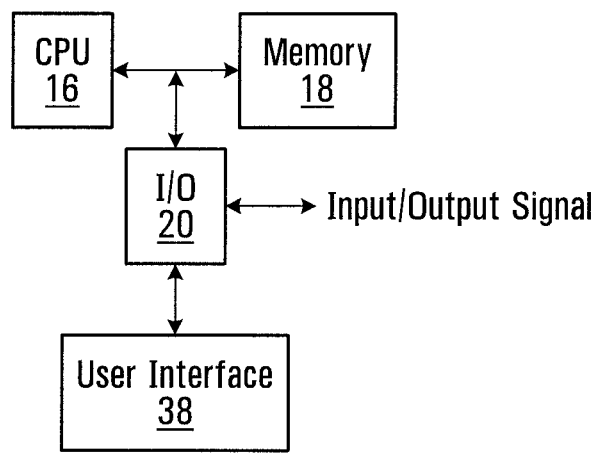
FIG. 8 is a block diagram of a user interface module for setting system parameters.
FIG. 9 is another representation of a user interface on a display device for setting system parameters.

In a possible variant, the parameters set via the user interface 28 can be set via a user interface that is directly connected to the controller module 14. FIG. 8 is a block diagram illustrating such an arrangement while FIG. 9 illustrates the user operable controls for the various settings.

With reference to FIGS. 8 and 9, the I/O 20 connects to the user interface 38 which can be implemented over a touch sensitive display or another platform. In addition to the parameters shown at FIG. 7, the user interface shows the amount of the time the electric vehicle 15 can sustain the power drain of the dwelling in the case of power failure. The field 42 indicates to the user the time, in terms of minutes, hours or days during which the dwelling will be supplied with electricity. The time computation is performed by the controller module 14 on the basis of the current power consumption of the dwelling and the available electrical capacity of the vehicle 15. The time computation is updated periodically to take into account changing electrical energy consumption needs, such as when the user turns on or off an appliance.

Figure 10:
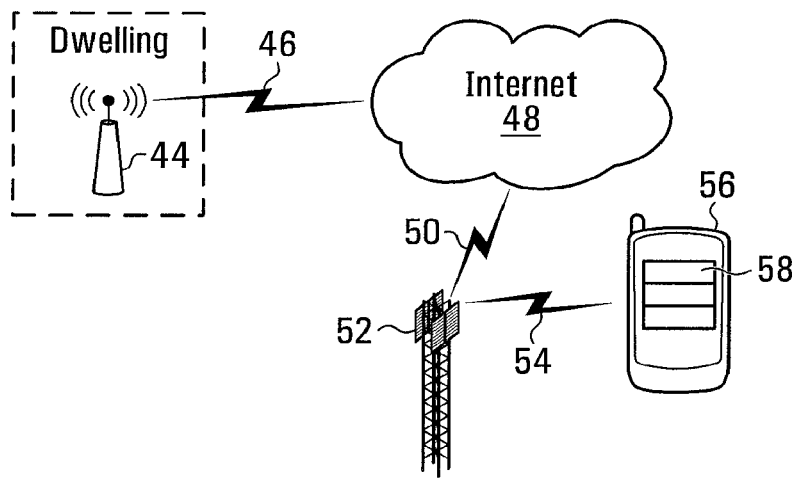
FIG. 10 is a diagram of a network allowing to exchange data between the controller module of FIG. 2 and a smart phone.

With reference now to FIG. 10, another variant is to set the parameters remotely by using a smart phone that can communicate over the Internet with the entity in the dwelling that controls the parameters setting, namely the controller module 14, the electric vehicle charger 22 or another. In this example the entity implements a web interface that communicates via a wireless access point 44 with the Internet over a communication link 46. The smart phone of the user also connects to the Internet via a cellular connection 54 which in turn connects to the Internet via a communication link 50. By this arrangement, the entity controlling the parameters setting can exchange messages with the smart phone 56.

The smart phone 56 runs an application that has a user interface which could be identical to the one shown at FIG. 9B, providing the user with controls which enable setting the relevant parameters. In addition, the entity controlling the parameters setting is capable of sending status messages to the smart phone 56. In one example of implementation, those status messages can be sent as text messages 58. The status information that can be sent includes the following:

1. An event has occurred, such as a power failure or an under-frequency and the electric vehicle 15 is currently supplying electrical power to the electrical control panel 10 or to the AC power distribution network (in the case of under-frequency only);

2. The rate at which electrical power is being supplied;

3. The time during which the dwelling consumption can be sustained by the electric vehicle;

4. Whether the ICE or fuel cell has been started for power generation;

5. Whether the AC power distribution network is being supplied or only the dwelling is being supplied;

6. End to the power failure and termination of power draw from the electric vehicle;

7. Total time during which the electric vehicle supplied electric power and the amount of electric power so supplied;

8. Monetary credit applied to the electric utility bill of the user, if the AC power distribution network was supplied with electricity.

Figure 11:
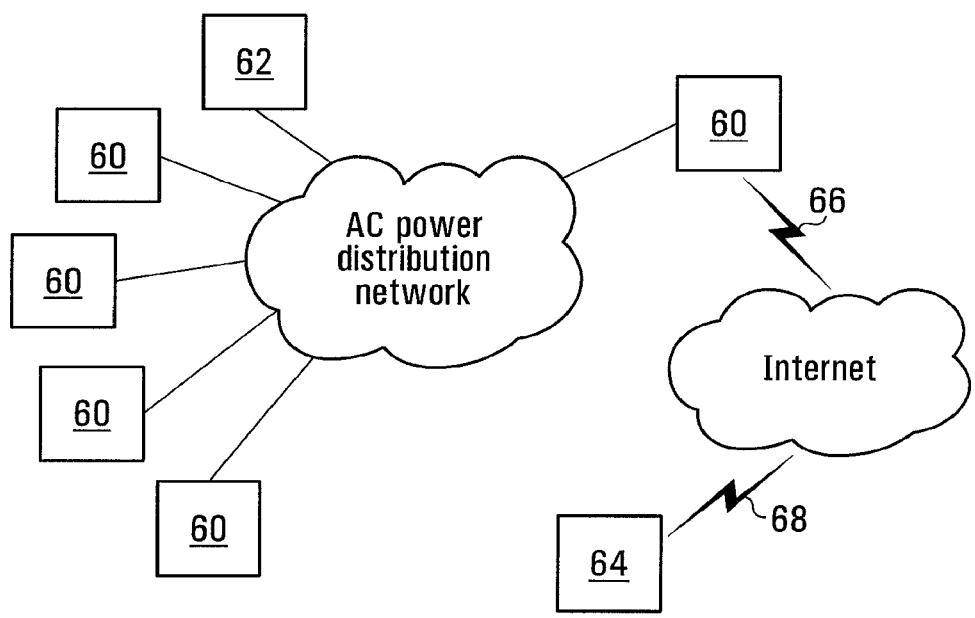
FIG. 11 is a diagram of a network allowing to exchange information between the controller module of FIG. 2 and a server for computing credit for the use of an electric vehicle to support the AC power distribution network.

FIG. 11 illustrates a diagram of the communication paths used by the AC power distribution network operator to gather data on the energy injection into the network performed by electric vehicles of clients in order to credit their accounts. As shown in the drawings, the AC power distribution network supplies dwellings 60 and also industrial facilities 62. Each dwelling 60 (only one is shown in the drawing but it is to be understood that all dwellings are so connected) communicates with a server 64 that manages client's accounts. More specifically, the controller module 14 installed in the electrical power distribution panel 10 or elsewhere in the dwelling can exchange data with the server 64 by sending messages via the internet and respective communication links 66, 68. Those messages are intended to convey to the server 64 information allowing the server to compute a credit amount for the electricity injected into the AC power distribution network and to allocate that credit amount to the proper account.

The information which is being communicated to the server 64 with the messages is as follows:

1. An identifier of the electric vehicle that was used to supply the electrical energy. That information would typically be obtained from the electric vehicle itself when it communicates with the controller module 14 and then it is relayed to the server 64. The identifier is any unique combination of characters or symbols allowing distinguishing one electric vehicle from another.

2. Amount of electrical energy that was injected in the network, for example in kWh.

3. The source of the electrical energy, namely the battery or the ICE driving the generator or a fuel cell.

Electrical energy injection in the AC power distribution network is performed during an under frequency event, which typically indicates a generation deficit, in other words the load on the network exceeds the generation capacity. The intent of such electrical energy injection is to stabilize the network for the time necessary to bring on line addition power generation resources. This time period may be short; in the order of a couple of seconds but can extend much longer depending on the nature and magnitude of the imbalance between the load and the generation capacity.

Since the duration of the electrical energy injection required to stabilize the network is not known at the onset of the under frequency event, the information exchanged between the server 64 and the controller module 14 is done when the event ceases.

The controller module 14 is configured to determine when an under-frequency event occurs and when it ceases by observing the frequency of the power supply. Accordingly, the controller module 14, upon concluding that the under-frequency event is resolved, sends the information to the server 64. In a possible variant, the controller module 14 waits for the server 64 to request the information. This option allows the server to poll the dwellings when appropriate. Another possibility is for the controller module 14 to periodically send the information to the server 64.

Under anyone of those possibilities, the controller 14 will collect the information and send it, either on its own initiative or when requested by the server 64.

Figure 12:
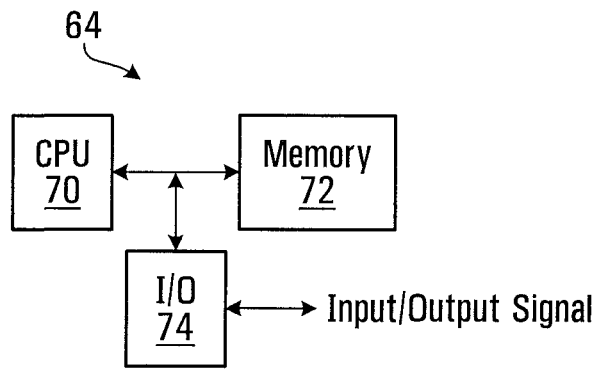
FIG. 12 is a block diagram of the server shown in FIG. 11.
Figure 13:
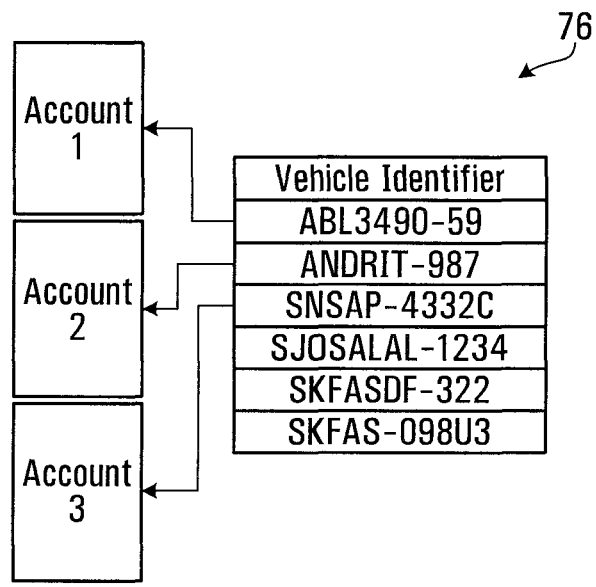
FIG. 13 illustrates the structure of a table linking identifiers of electric vehicles with user accounts.

FIG. 12 illustrates a block diagram of the server 64. The server has a CPU 70 executing software stored in a machine readable storage medium (memory) 72. Input and output signals transit through an I/O 74.

The machine readable storage contains a table mapping vehicle identifiers to respective client accounts. There is an advantage to credit the account of the vehicle owner rather than compute the credit based on the account associated with the dwelling. While in most cases, when a power injection is performed by an electric vehicle, the injection will occur when the vehicle is in the owner's dwelling. But this is not always the case. There may be instances where an electric vehicle is plugged for charging at a location where the owner does not live. In those cases, when a power injection is performed, the credit should not be associated with the location, rather with the owner of the vehicle.

The table 76 contains a list of identifiers of electrical vehicles that are registered with the operator of the AC power distribution network. Each identifier is mapped to a respective account, such that when a credit is due, that credit will go the account associated with the electric vehicle.

Figure 5:
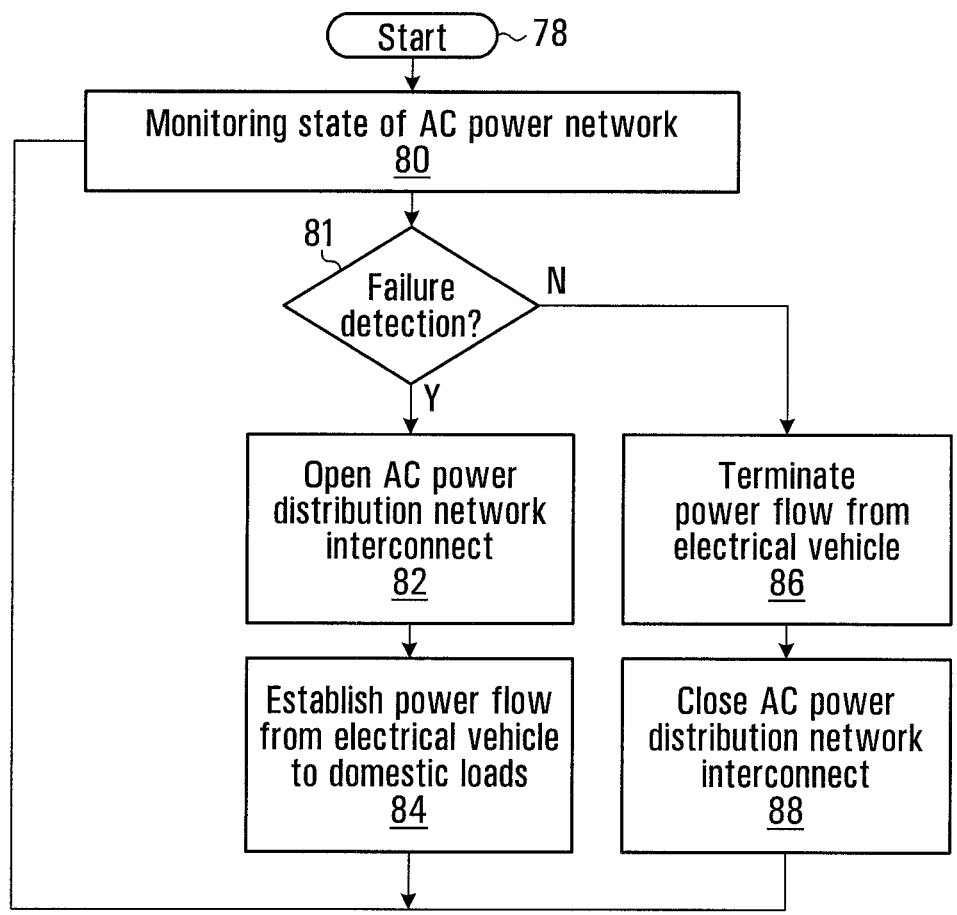
FIG. 5 is a flowchart of a process for controlling the power flow between the electric vehicle and the electrical power distribution panel.

FIG. 5 illustrates the process implemented by the controller module 14 when a power failure is detected at the dwelling.

The process starts at 78. At step 80 the controller module 14 constantly monitors the state of the AC power distribution network for a power failure. The method used for sensing a power failure may vary, but one possible approach is to measure the voltage difference between the power supply terminals at the AC power distribution network side. When the voltage differential drops to a certain level, say below 100 V, the controller module 14 determines that a power failure is occurring. In this instance, the decision step 81 is answered in the affirmative and the process proceeds to the next step.

At step 82, the controller module 14 issues a control signal to open the power interconnect between the AC power distribution network 14 and the electrical power distribution panel 10. The interconnect can be implemented by a contactor, which is essentially an electrically controlled switch used for switching a power circuit. When the contactor is open, the electrical installation in the dwelling is isolated from the AC power distribution network.

At step 84, the controller module 14 commands the electric vehicle to supply electrical power to the dwelling. This is effected as discussed earlier, namely by exchanging handshaking signals with the electric vehicle to establish its available resources, and also on the basis of system parameters.

For example, assuming the vehicle has a fully charged battery and an ICE/electric generator combination that has been enabled in the system parameters, the controller module 14 will direct the electric vehicle to first start supplying electrical energy from the charged battery until the battery is completely depleted or when a minimal level of charge, set in the system parameters is reached.

When the limit is reached and assuming the power failure is still ongoing, the controller module 14 will send a command to remote start the ICE to continue generating power for local use.

The steps 80 and 81 form a continuous loop during which the controller module 14 monitors the state of the AC power distribution network. When the power failure has been resolved, the process branches to step 86 which will terminate the power flow from the electric vehicle to the dwelling. This is effected by sending control signals to the electric vehicle to command the vehicle to stop supplying electrical power. Subsequently, at step 88 the power interconnect closes such that electrical power can be drawn from the AC power distribution network.

Figure 14:
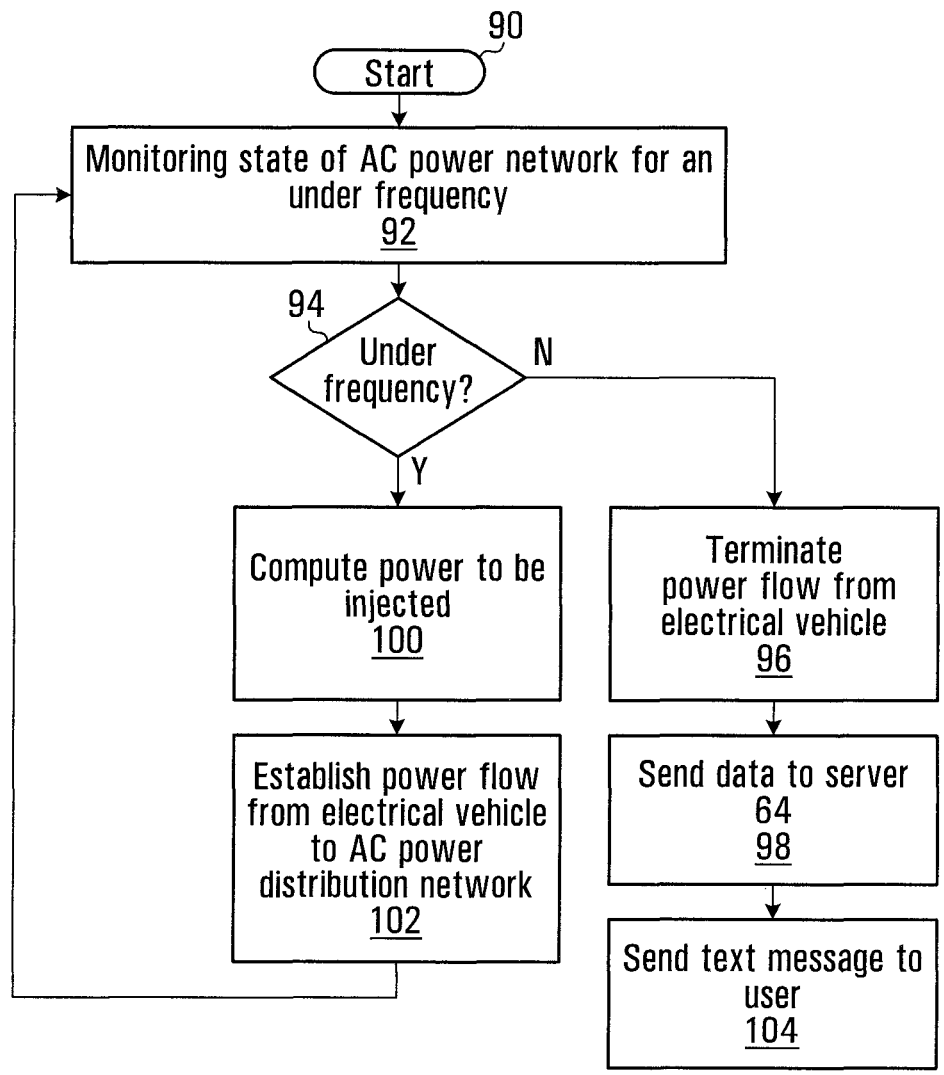
FIG. 14 is a flowchart illustrating the various steps performed by the controller module when the AC power distribution network experiences an under frequency event.

FIG. 14 is a flowchart illustrating the process performed by the controller module 14 when the AC power distribution network experiences an under frequency condition.

The process starts at step 90. At step 92 the controller module 14 determines if an under frequency condition exists. This operation can be performed by measuring the frequency at the power connections on the AC power distribution network side. Examples of frequency information processing done to determine if an under frequency condition exists and the extent of the imbalance between the load side and the generation side of the AC power distribution network are known and do not require further discussion.

If an under frequency condition is detected, which means that the decision step 94 will be answered in the affirmative, the processing proceeds to step 100 where the degree of energy injection from the electric vehicle to the AC power distribution network is determined. The power injected is related to the frequency; the larger the magnitude of the under frequency condition the higher the power supplied. The power supplied can be related to the difference between the current frequency and a nominal frequency (which is 60 Hz in North-America). Alternatively, the degree of power injection can be determined on the basis of the rate of variation of the frequency which is an indicator of the AC power distribution network inertia.

Note that step 100 is dynamic, in the sense that the under frequency condition is continuously being monitored and the power injected in the AC power distribution network continuously adjusted. For instance, if the under frequency condition worsens the controller module 14 will command more power from the electric vehicle to stabilize the network.

At step 102 the power flow to the AC power distribution network is initiated. The controller module 14 via the handshaking/control signals triggers the power flow at the desired magnitude. Since the electric vehicle provides DC power, which cannot be supplied as such to the AC power distribution network, it is applied to an inverter which converts it in AC form and also synchronizes the wave form such that it is in phase with the wave form on the AC power distribution network side.

Power control can also be effected via the inverter. The control module 14 sends control signals to the inverter such that it presents a variable load to the electric vehicle. When a higher power is required, the load is increased and the electric vehicle increases the output accordingly.

If the battery of the vehicle is fully charged, it will be able to respond to most under frequency conditions since those conditions are typically not long lasting. However, when the battery is not fully charged, there may be an advantage to use the ICE/electric generator combination or fuel cell for power injection. In such case, the controller module 14 causes the ICE to start remotely to generate power. In extreme under frequency conditions both the battery and the ICE/generator can be used in parallel for power input.

When the under frequency condition subsides, the decision step 94 is answered in the negative, the controller module 14 terminates the power flow from the electrical vehicle at step 96 and send the data summarizing the operation to the server 64 for generating a credit to the user account, at step 98.

At step 104 the controller module 14 sends a text message to the smart phone of the user to indicate that an under frequency event has occurred and that the electric vehicle has been supplying power to the AC power network.

Figure 15:
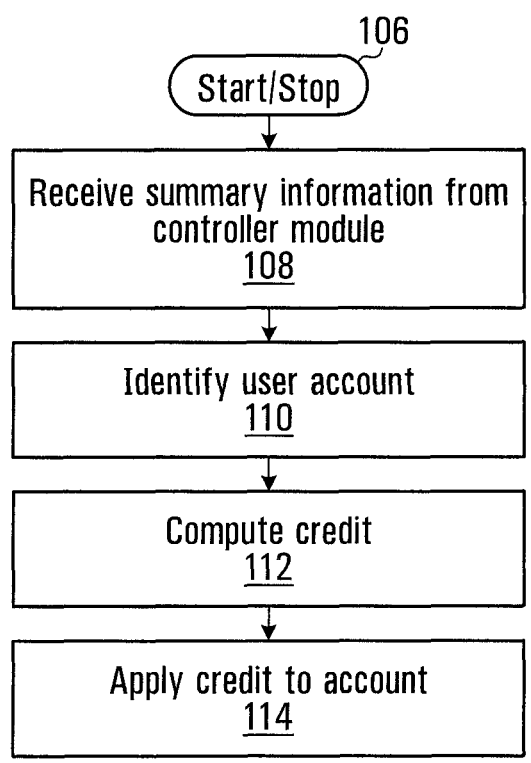
FIG. 15 is a flowchart of a process performed by the server shown in FIGS. 11 and 12, to credit a user account for the power injection in the AC power distribution network.

FIG. 15 is a flowchart that describes the process performed by the server 64 to compute and allocate a credit for the use of the electric vehicle to support the AC power distribution network during the under-frequency condition.

The process starts at step 106. At step 108 the server receives the summary information from the controller module 14. At step 110 the server identifies the user account to which any credit will be applied on the basis of the electrical vehicle identification data sent by the controller module 14.

At step 112 the amount of credit is computed. The credit can be determined based on multiple factors. One of those factors is the source of the electrical power, battery or ICE/generator or fuel cell. In the case of the battery the credit is lesser than the other cases because there is less inconvenience to the user. Since most under frequency events are not long lasting, the discharge of the battery is limited. If the ICE/generator or fuel cell is being used, the credit is increased to compensate the user for the fuel burned and over inconvenience to remote start the ICE/fuel cell.

Figure 16:
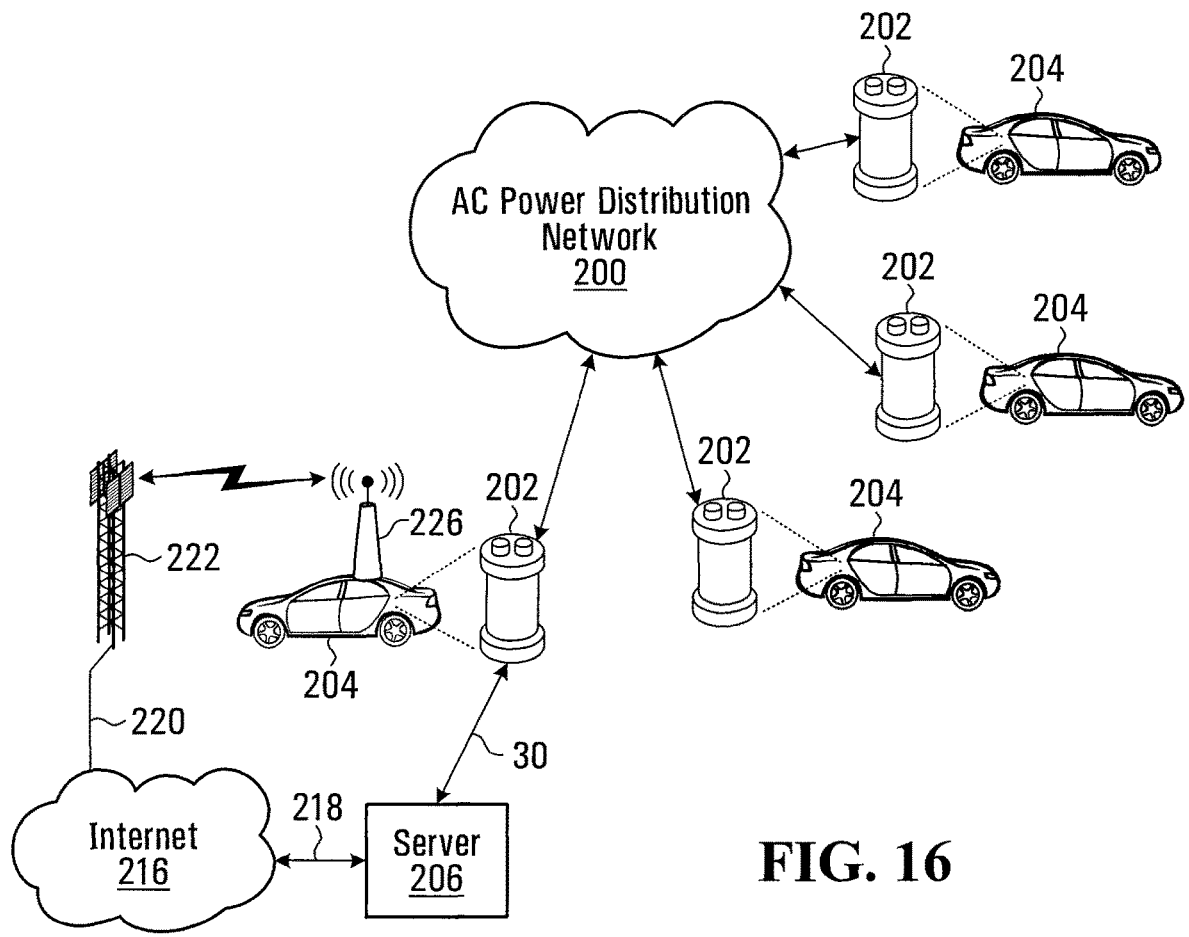
FIG. 16 is a block diagram illustrating an AC power distribution network that supplies electrical charging stations installed throughout a city, region or country.

FIG. 16 is a block diagram illustrating an AC power distribution network 200 that supplies electrical energy to homes and industries over a certain geographic region. That region can be city, a province or state or an entire country. The AC power distribution network 200 also supplies electrical energy to charging stations 202 that are used to charge the electrical batteries of electrical vehicles 204.

The AC power distribution network infrastructure uses a server arrangement 206, including a single or multiple servers that can be clustered at a single location or installed remotely from one another, exchanging data over communication links (not shown). The server arrangement 206 manages the supply of electrical energy from the batteries of the respective electric vehicles 204 to the AC power distribution network 200.

Normally, the power flow in the arrangement shown in FIG. 16 is in the direction from the AC power distribution network 200 toward the electric vehicles 204, to charge the batteries of the electric vehicles 204. When a large number of electric vehicles 204 are being connected to the AC power distribution network 200, they collectively provide a significant electric supply capacity that the AC power distribution network 200 may use in certain circumstances, such as during overloads and/or when it experiences a generation deficit, which manifests itself by a frequency deviation.

The collective electric supply capacity is dynamic, in the sense that it changes over the course of the day in size and geographical distribution. For instance, during the night the collective supply capacity is at its peak, since electrical vehicles are charging and are not being used. During the day, the collective supply capacity is reduced as some of the electric vehicles move and are not connected to the AC power distribution network 200. In terms of geographical distribution and taking the example of an urban environment, during the night most of the electric supply capacity is located in the city suburbs while during the day a component of the supply capacity migrates downtown, reflecting commute patterns.

There are advantages for the AC power distribution network 200 to rely on the collective supply capacity to enhance the stability of the AC power distribution network 200 and to free generation reserves that may be put to better use instead of continuously remaining on standby just in the case an emergency arises.

To be able to reliably use the collective supply capacity the AC power distribution network 200 performs continuously queries on the collective supply capacity to ascertain the available capacity and the geographical distribution of that capacity. The AC power distribution network is then managed by taking into account the capacity and/or geographical distribution factors. One specific example is to adjust continuously the operating reserves of the AC power distribution network on the basis of the collective power supply capacity that is currently available. The operating reserves is essentially a generating capacity that can be invoked in case of an emergency, such as when the AC power distribution network experiences a power generation deficit. Typically, the operating reserves include spinning reserves, which is the additional power generation that can be provided from generators currently online and supplemental reserves, which typically include extra generating capacity that is not online, such as generators that sit idle and that are ready to be brought online.

Knowledge of the available collective power supply capacity allows the system operator to modulate the operating reserves accordingly. For example, when the collective power supply capacity is relatively high, the operating reserves may be reduced accordingly by making more electricity available for export to other power grids to which the AC power distribution network connects. Alternatively, when the collective power supply capacity is relatively low, the operating reserves are increased by retracting power that is currently being exported to other power grids.

Such modulation of the operating reserves allows frees additional electric power for export, which is financially beneficial for the operator of the AC power distribution network, without putting the AC power distribution network at any additional risk.

The management function is performed by the server arrangement 206. As shown at FIG. 20, the server arrangement 206 is essentially a computing platform 208 that executes software, which implements the management logic. The computing platform 208 includes a CPU 210 that communicates over a data bus with a machine-readable storage 212 in which the software is stored, in addition to data that is processed by the software. An I/O interface 214 represents the various hardware and software components through which external data is input and internal data is output.

The server arrangement 206 assesses the collective supply capacity by querying individual electric vehicles 204 or proxies of the electric vehicles 204, such as the charging stations 202 to which the electric vehicles 204 connect.

The communication between the server arrangement 16 and the individual electric vehicles 204 or proxies can be accomplished over a data communication network 216, such as the Internet. More specifically, the data pathway between the server arrangement 206 and any one of the electric vehicles 204 includes a first hard wired data segment 218, a second hardwired data segment 220 leading to a cell tower 222, followed by a wireless data segment 224 up to the vehicle's antenna 226. Alternatively, when the charging station 202 is being used as a proxy, the data pathway includes a hardwired segment 230 leading from the charging station 202 to the Internet 216. Note that the above is only an example and other arrangements are possible, including the substation of hardwired links by wireless ones and vice versa. Also, the data communication may use a data communication network other than the Internet, which can be dedicated to the purpose of communication between the server arrangement 16 and the individual electric vehicles 204 or their proxies. Another possibility is to use the AC power distribution network 200 both for communication and power transfer. Communication over the power links of the AC power distribution network can be performed by impressing over the 60 Hz wave a high frequency signal encoded with the information to be transmitted. Alternatively, the frequency of the power supply can be modulated to convey a digital signal. Such modulation is small; the variation of the frequency remains in the zone considered "normal" for the operation of the AC power network 200. The advantage of this approach is that it allows broadcasting a message to all devices connected to the AC power distribution network 200 without the need of sending a signal over a separate medium.

The process performed by the server arrangement 206 to query an electric vehicle 204 is illustrated by the flowchart shown at FIG. 26.

At step 1100 the server arrangement 206 detects the connection of the electric vehicle 204 to the AC power distribution network 200. At that step the server arrangement 206 is essentially made aware that the electric vehicle 204 has connected to the network 200. This operation can be performed in a number of ways.

A first possibility is for the electric vehicle 204 to communicate directly with the server arrangement 206. When the electric vehicle 204 is connected to the charging station 202, the vehicle senses the connection and issues a wireless signal that travels to the cell tower 222 and then over the data communication path 220 and over the Internet 216 and then to the server arrangement 206.

Alternatively, the issuance of the message may not be triggered by the connection to the AC power distribution network 200. It is possible to configure the electric vehicle 204 such that it reports its status to the server arrangement 216 at predetermined intervals. For example, the electric vehicle 204 issues a message to the server arrangement 216 every 5 minutes to update its status. Note that the reverse arrangement is also possible, where the server arrangement 216 polls the electric vehicles 204 that are likely to be connected to the AC power distribution network 200 at some point.

Another variant is to allow the electric charging station 202 to update the server arrangement 206 when an electric vehicle 204 connects to the charging station 202. In such case the electric charging station 202 exchanges handshaking signals with the electric vehicle, wirelessly or over a hard line that typically is integrated in the charging connector, to obtain the necessary information which is then passed to the server arrangement 206.

Irrespective of the method of communication selected, the status data sent to the server arrangement 206, shown at step 1102 is as follows:

1. An identifier of the electric vehicle or the battery (in cases the battery is owned by an entity other than the owner of the electric vehicle)—the identifier can be any string of alphanumeric characters. The identifier allows mapping the vehicle or battery to an account, as it will be discussed later.

2. A geographic location of the vehicle. This information can be derived from GPS coordinates from the vehicle's GPS receiver that are passed to the server arrangement 206.

3. The identifier of the charging station 206 to which the electric vehicle 204 is connected. The identifier may be used by the server arrangement 206 to obtain the geographical location information, instead of relying on the GPS coordinates. The server arrangement 206 stores a table mapping the identifiers of the charging stations 202 with respective geographical locations.

4. Electrical vehicle capability information, including the following:
 (a) Is the vehicle authorized to be operated as an electrical energy source? This is a setting allowing the vehicle owner to enable or disable the energy source function of the electric vehicle 202;

(b) The electrical supply capacity that is available. For example, when the electrical vehicle is a BEV, in other words it has an electrical battery only, the electrical vehicle capability information includes the state of charge of the battery that allows the server arrangement 206 to compute the amount of electrical energy the battery can supply, if required to do so. Note that a setting can be provided in the electric vehicle 202 allowing limiting the amount of electrical energy made available for supplying the AC power distribution network 200. For instance, the setting allows the owner of the electric vehicle 204 to limit the amount of electrical energy back flow to the AC power distribution network 200 to a certain percentage of the overall capacity of the battery. When the electrical vehicle includes a supplemental source, such as an internal combustion engine driving an electrical generator, or a fuel cell, the electrical vehicle capability information conveys whether this supplemental power source is enabled and the extent to which it can be used for supplying the AC power distribution network 200. As in the case of a BEV vehicle, settings can be provided in the electrical vehicle 204 allowing the owner to enable or disable the operation of the supplemental power source for supplying the AC power distribution network 200, or to limit its operation, in terms of kW/h, time, or amount of fuel consumed.

At step 1104 of the flowchart in FIG. 26 the status information is received and processed. The processing includes determining the capacity for energy supply back to the AC power distribution network 200 that is available from the particular electric vehicle 204. The capacity depends on three factors, namely the state of charge of the battery, any limits the owner has set on the use of the battery and the availability and capacity of the supplemental power source. Based on these three factors, the software executed by the server arrangement 206 can compute what capacity is available from that particular electric vehicle 204. Note that the available capacity is not static but varies with time. As the battery is being charged, the capacity increases. One way to update the server arrangement 206 on the increased capacity available is to sends updates to the server arrangement 206 at regular intervals, conveying the new state of charge.

The software then adds-up the supply capacity for all the electric vehicles 204 that are registered, in other words identified as being connected to the AC power distribution network 200 to derive the collective supply capacity. Optionally, the computation can determine the supply capacity available per sub-zone of the AC power distribution network 200, on the basis of the geographic information conveyed when the electric vehicle 15 is registered on the AC power distribution network 200. In this fashion, the program logic determines for each sub-zone how much supply capacity exists at any given moment. A sub-zone is a subdivision of the AC power distribution network 200 and can correspond to a district, locality, city or even be larger than a city. Since electrical power does not always flow seamlessly from one part of the AC power distribution network 200 to another, knowledge about the distribution of the supply capacity can be useful in performing the management of the AC power distribution network 200, in particular managing sub-zones differently from one another.

In a possible variant, the assessment of the collective supply capacity can be performed in a simpler fashion, relying on statistical information, instead of obtaining state of charge information from the electrical vehicle 204. For instance, given the large number of electric vehicles 204 registering on the AC power distribution network 200, the program logic can use an average capacity per electric vehicle 204, which has been conservatively set. In such case, the program logic computes an approximation of the collective supply capacity based on the average capacity of a single electric vehicle 204 and the number of the electric vehicles 204 registered on the AC power distribution network 200.

At step 1105, the operating reserves of the AC power distribution network 200 are adjusted on the basis of the forecasted collective supply capacity. If the collective supply capacity increases because more electrical vehicles 204 connect to the AC power distribution network 200, then the operating reserve is reduced. Such reduction can be accomplished by exporting more electricity to power grids that interconnect with the AC power distribution network 200. On the other hand, if the collective supply capacity decreases, such as when more electric vehicles are on the road and thus are disconnected from the AC power distribution network 200, then the operating reserve is reduced, namely by retracting fully or partially the electricity that is being exported out of the AC power distribution network 200.

The loop back arrow from block 1105 in FIG. 26 illustrates the process in the flowchart as a loop, in the sense that it repeats constantly to update the assessment of the collective supply capacity available from electric vehicles registered with the AC power distribution network 200.

In a possible variant, the adjustment of the operating reserves can also be performed when the AC power distribution network 200 supplies a dynamic load, which can respond to frequency deviations. For example, the Canadian patent application 2, 809, 896 in the name of Bipco-Soft R3, the contents of which is hereby incorporated by reference, describes a power control device that can be connected to a domestic electrical equipment unit, such as a water heater, to regulate the electrical consumption of the water heater when the frequency of the electrical energy supplied by the AC power distribution network deviates from the nominal frequency. More specifically, when the frequency of the electrical energy drops as a result of a power generation deficit in the AC power distribution network, the power control device will reduce the electrical consumption of the domestic electrical equipment unit such as to lessen the load on the AC power distribution network and counterbalance the power generation deficit. The power control device operates autonomously; it does not require an external signal to trigger the electrical consumption response when an under frequency condition arises. Accordingly, when multiple power control devices are installed in the AC power distribution network, they have an aggregate effect and contribute to markedly lower the load when an under-frequency event occurs.

The Canadian patent application 2,809,896 also describes a method for testing the AC power distribution network to forecast the aggregate load reduction that would be manifested when an under-frequency condition occurs. The testing is performed by commanding remotely the plurality of power control devices, when the AC power distribution network is an a state of balance between power generation and load, to reduce the consumption of the respective domestic electrical equipment units, and to observe the behavior of the AC power distribution network to such reduction, namely evaluate how much the overall load recedes.

By using the testing method described in the Canadian patent application 2,809,896, it is possible to adjust the operational reserves of the AC power distribution network. When the behavior of the AC power distribution network is well understood as a result of the testing, the reserves can be lowered on the expectation that the load will recede when an under frequency condition arises. The degree of reserve lowering is based on the expected degree of load recessing. For example, the degree of reserve reduction can be equal to the amount of load recessing plus a safety factor.

The process which is performed when the electric vehicle 204 is no longer registered with the AC power distribution network 200, in other words it is disconnected from the AC power distribution network 200, which occurs when the electric vehicle 204 is used to travel, is shown by the flowchart at FIG. 27.

At step 1200, the server arrangement 206 detects the disconnection of the electric vehicle 204 from the AC power distribution network 200. This can be done by sending a message to the AC power distribution network 200, originated by the electric vehicle 204 or by the charging station 202. Once the disconnection message is received by the server arrangement 206, it performs an update process shown at step 1202 to the collective supply capacity by subtracting from the currently assessed capacity the one of the electric vehicle 204 that is no longer available to supply energy to the network 200. The operating reserves are adjusted at step 1204, as discussed in connection with FIG. 26.

Figure 17:
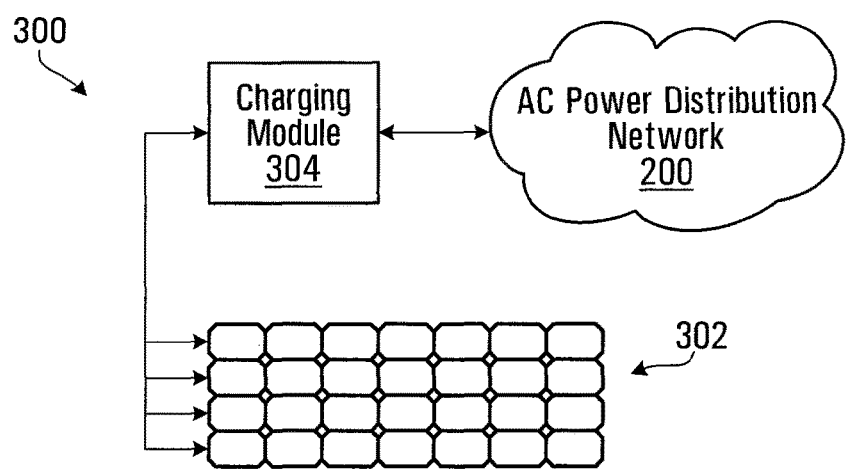
FIG. 17 is a block diagram of a battery swapping station connected to an AC power distribution network for recharging electric batteries, which are periodically swapped with discharged batteries.

FIG. 17 illustrates a somewhat different arrangement than FIG. 16, in which a battery swapping station 300 connects to the AC power distribution network 200. A battery swapping station is an installation where an electric vehicle 204 swaps a depleted battery for a charged one. Typically, the operation is automatic. The electric vehicle 204 enters the installation, stops and a battery swap robot removes the depleted battery from below the vehicle and replaces it with one that is fully charged. The electric vehicle 204 then leaves the station.

The battery swapping station 300 has a charging rack where discharged batteries 302 that have been removed from electric vehicles 204 are placed and connected to the AC power distribution network 200 for charging. The batteries 302 that are fully charged can be taken up by the robot for installation in an electric vehicle 204 that comes to the station for a battery swap.

A charging module 304 controls the charging process of the batteries 302. The charging module 304 senses the state of charge of each individual battery and determines when the charging process is completed. The charging module 304, which includes a control function having an architecture similar the one illustrated in FIG. 20 that is basically a computing platform, executes software that manages the charging process of the batteries 302 and also the exchange of messages with the server arrangement 206 to convey to the server arrangement the supply capacity of for the power back flow to the AC power distribution network 200 that is available from the battery pool. The message, which can be sent in the same way as discussed in connection with the example at FIG. 16, contains information identifying the batter swapping station, which allows the server arrangement 16 to determine its location, and information about the capacity available.

Since the capacity available changes when charged batteries are dispensed and discharged ones received, an update message is generated by the charging module 304 when the status of the battery swapping station changes, or at regular intervals. For instance an update message can be sent every time a charged battery is dispensed.

In the embodiments shown at FIGS. 16 and 17, the back flow of electrical power to the AC power distribution network 200 can be triggered by performing an assessment of the need of the AC power distribution network 200. This assessment can be done locally, namely at or near the location where the electrical vehicle 204 of battery swapping station is located. Alternatively, the assessment can be performed remotely and a command signal sent to all electric vehicles 14/battery swapping stations registered with the AC power distribution network or to a sub-set thereof.

The local assessment can be done by reading the frequency of the AC power supply which is an indicator of the stability of the AC power distribution network 200. For example, when the AC power distribution network 200 experiences a generation deficit which translates into an imbalance between the generation side and the load side of the network, the frequency drops at a rate that is determined by the inertia of the network 200. Accordingly, the local assessment involves reading the frequency information, which is performed by sensing the frequency from the power connectors to the AC power distribution network 200, processing the information to determine if there is a need to supply electrical power to the AC power distribution network 200 from the electric vehicle 204, and in the affirmative initiate the back flow of electric power to the AC power distribution network 200 at a rate that depends on the needs of the AC power distribution network 200.

The frequency processing can be performed at the charging station 202 or at the electric vehicle 204, as it will be discussed in detail hereinafter.

Figure 28:
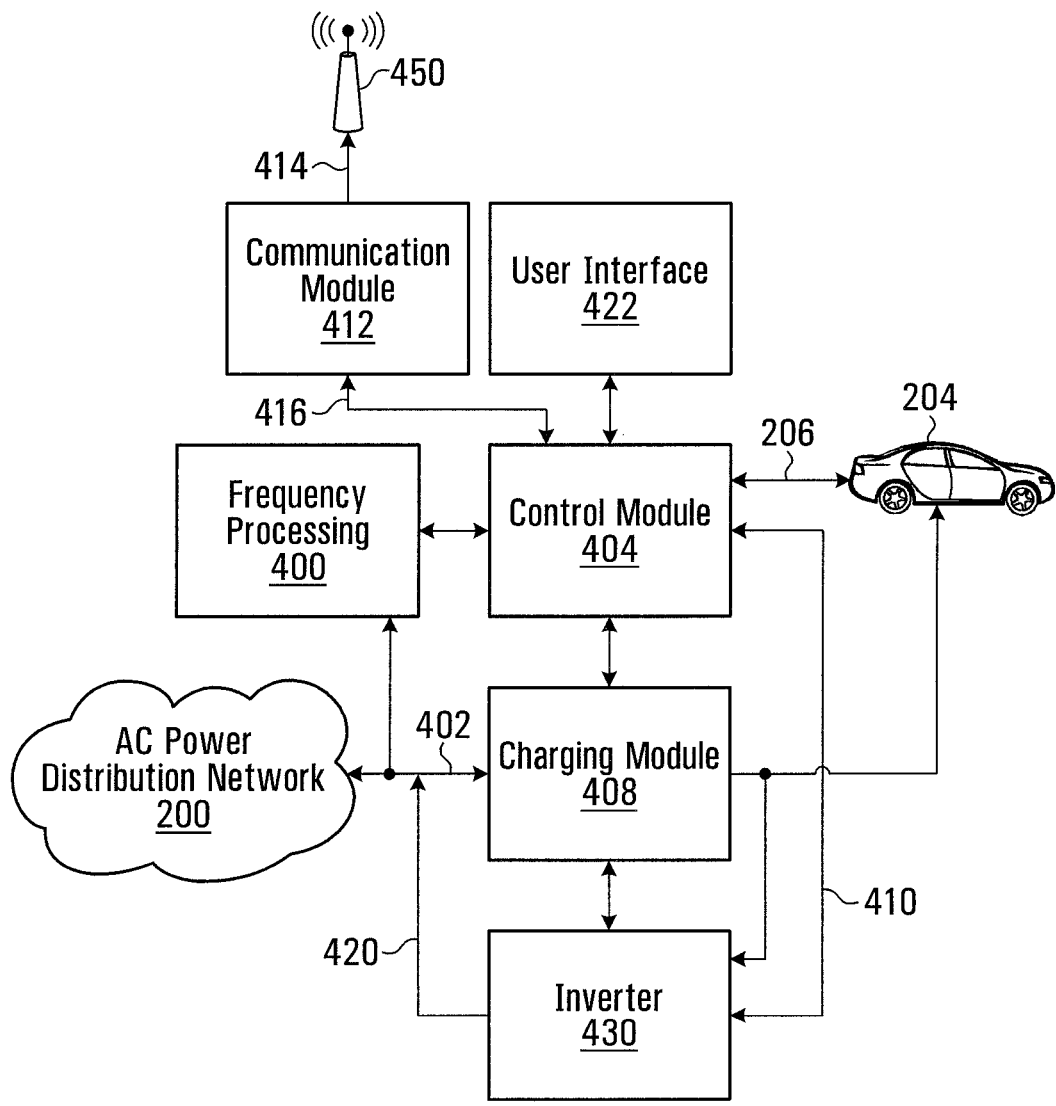
FIG. 28 is a block diagram of the electrical vehicle charging station shown at FIG. 16.

FIG. 28 is a block diagram of the charging station 202 which integrates the functionality of local processing to assess the needs of the AC power distribution network 200 and also the control function to regulate the rate at which electrical power is injected in the AC power distribution network 200.

The charging station 202 has a frequency processing module 400 which connects to the AC power supply 402 of the AC power distribution network 200 to read the frequency information. The frequency information is then processed. The processing can be performed according to the methods and devices, which are known in the art. The output of the frequency processing module 400 indicates whether there is a need to supply electrical power to the AC power distribution network 200 and how much. Typically, an under frequency condition indicates that the AC power distribution network 200 is unstable and needs support, hence there should be a power injection from the battery of the electric vehicle 204. The magnitude of the under frequency determines the rate at which power should be injected from the electric vehicle 204 into the AC power distribution network 200.

The output of the frequency processing module 400 is directed to a control module 404 which regulates the charging function of the charging station 202 and the back flow of electrical power from the electric vehicle 204 to the AC power distribution network 200.

The control module 404 communicates with the electric vehicle 204 over a communication path 406 which can be wireless or wire line. Handshaking signals are exchanged between the control module 404 and the electric vehicle 204 to initiate the charging of the battery of the electric vehicle 204 and regulate the back flow of electrical power from the battery of the electric vehicle 204 into the AC power distribution network 200.

A charging module 408 performs the charging operation. In one example, it converts the AC voltage received at power connectors 402 into DC voltage that is impressed at the vehicle's battery. Alternatively, the charging module 408 outputs AC voltage which is converted into DC voltage by the power electronics on the electric vehicle 304. Note that the charging module 408 can be wireless or wire line. For example of a wireless charging module can transmit power to the electric vehicle 204 by induction.

An inverter 430 regulates the back flow of electric power from the electric vehicle 204 to the AC power distribution network 200. A communication path 410 between the control module 404 and the inverter 430 allows the control module 404 to send control messages to the inverter 430 to regulate its operation. The control messages trigger the back flow of electrical power to the AC power distribution network 200 and control the rate at which power is injected, which is determined by the voltage of the sine waveform generated by the inverter 430 at its output 420. In addition the control messages synchronize the waveform at output 420 with the AC waveform at power connections 402, such that they are in phase.

The charging station 202 also includes a communication module 412, which exchanges messages with the entity managing the AC power distribution network 200, such as the server arrangement 206. The communication module communicates with the server arrangement 206 over a data network such as the Internet 216, via a communication path 414. In FIG. 28, the communication path 414 is shown as being wireless, but the communication path can also be wire line.

The communication module 412 communicates the commands received from the server arrangement 206 to the control module 404 over data communication path 416. Examples of commands send to the communication module include:

1. Initiate back flow of electrical power to the AC power distribution network. The command may also indicate:
  (a) Whether the back flow should be initiated immediately or after a predetermined amount of time;
  (b) Duration of the back flow;
  (c) Rate of back flow in kWh or in a relative fashion, such as low, medium or high.
2. Limit or stop the electric power consumption, in other words limit or stop the vehicle charging process. The command may also indicate:
  (a) If the command is to limit power consumption, by how much in kWh or percentage wise relative the current consumption.
  (b) Immediate or delayed implementation of the command and if delayed by how long.
  (c) Duration of the electrical consumption restrictions.
3. If the vehicle is equipped with a supplemental energy source, to remote start the supplemental energy source for power supply. The command may also indicate:
  (a) Immediate or delayed implementation of the command and if delayed by how long.
  (b) Duration of the power generation using the supplemental energy source.

Commands 1, 2 and 3 above can be used to perform certain management functions of the overall AC power distribution network 200, or certain sub-zones thereof. If collectively individual electric vehicles 204 respond to the commands, a grid-wide effect can be obtained. Examples of specific grid-wide functions that can be achieved with the commands include peak shaving, regulation up or down and production reserves. Also note that those commands are not necessarily sent to each electric vehicle 204 connected to the AC power distribution network 200. A sub-set of vehicles can receive the commands only, depending on local grid needs. Such localized control is performed when the server arrangement 206 senses an anomaly currently occurring or impending in the sub-division of the AC power distribution network 200. To counterbalance the anomaly, the server arrangement 206 determines what the corrective action should be and sends the command only to the vehicles 204 that are within the sub-division of the AC power distribution network 200. Since the server arrangement 206 is aware of the geographical location of the electric vehicles 204 that are connected to the network 200, it can filter out the ones, which are outside the sub-zone of interest and send the command only to the vehicles in the sub-zone.

Once a command is received by the communication module it is forwarded to the control module 404 over the data path 416 for implementation.

The charging station 202 also includes a user interface 422 allowing the user or operator to set parameters that control how the charging station 202 behaves for back flow operations. In a specific example of implementation, the user interface 422 is a graphical user interface that uses controls operable by the user to set the desired parameters.

Figure 24:
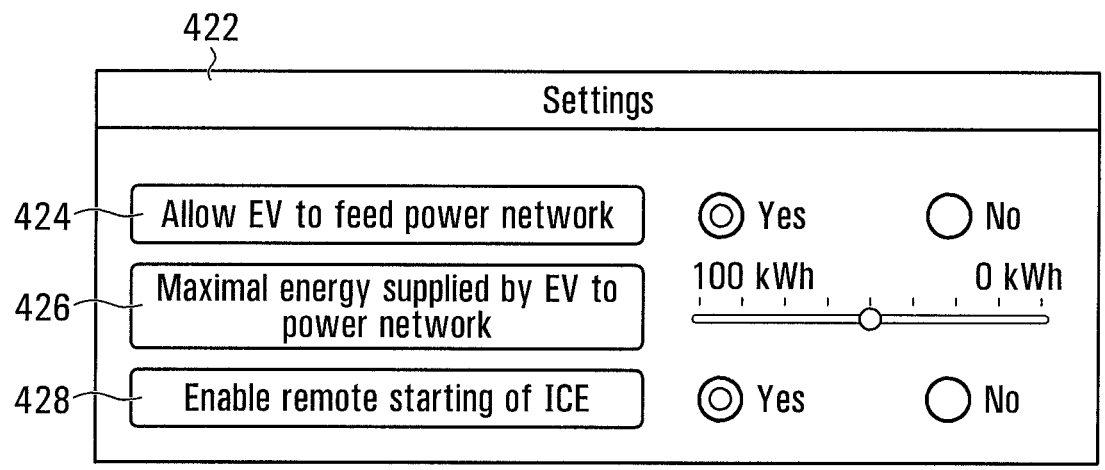
FIG. 24 is a representation of a user interface on a display device for setting system parameters in an electrical charging station.

FIG. 24 is an example of a display implementing the user interface 422 and allowing a user to set parameters of the charging station 202. In the example shown the user interface includes controls that can be manipulated by the user via a touch screen, however other forms of user input are possible such as by using a pointing device or keyboard.

The user interface 422 includes a first setting 424 allowing the user to enable or disable the electric vehicle to back feed the AC power distribution network 200. In the example shown the user interface control 424 includes radio buttons "yes" or "no" for this function. If the function is set to "no" then the electric vehicle 204 will not feed any electricity to the AC power distribution network 200. When the electric vehicle 204 is plugged to the charging station 202 it will only be charged, however in the case of locally detectable under frequency or explicit command sent to the communication module 412 no stored electrical energy will be supplied to the AC power distribution network 200.

The first setting 424 is a master setting. If the setting is set to "no" then the remaining settings are grayed out and cannot be changed. On the other hand, if the first setting 424 is set to "yes" then the remaining settings are enabled and respond to user input.

The second setting 426 determines the maximal amount of electrical energy the electric vehicle 204 can be tapped for the benefit of the AC power distribution network. The intent is to avoid a situation where the electric vehicle 204 completely depletes its battery with the result it can not be used. In those circumstances, it may be preferable to the user to maintain in the battery of the electric vehicle 204 a minimal charge to allow the vehicle 204 to be used.

In the example shown, the second setting 426 uses a slider control to set the maximal amount of electrical energy that can be drawn from the electric vehicle 204 measured in kWh. Alternatively, the slider can set the minimal state of charge of the battery of the electric vehicle 204. For example, the user may set the control such that the battery is not allowed to discharge beyond 50% capacity. In a yet another embodiment, the parameter can be expressed in terms of available range of travel.

The third setting 428 determines if the supplemental energy source, such as the Internal Combustion Engine (ICE) in an electric vehicle for electric power generation can be remotely started to supply electric power to the AC power distribution network 200. Besides what the user may found preferable from personal convenience perspective, there may be instances where remotely starting an ICE cannot be done for safety reasons. For example, if the electric vehicle 204 is in a closed space, such as a garage, the operation of the ICE will create carbon monoxide that can become a safety hazard. In other instances, the operation of the ICE may create noise that is objectionable. The setting 428 thus allows the user to take these factors into account and enable or disable automatic remote starting for electrical energy generation, at the particular charging station 204.

The parameters set via the user interface 422 are stored in the memory of the control module 404. During the operation of the charging station 202, those settings determine how the charging station 202 will behave when there is a need to supply electrical power to the AC power distribution network 200. The control module 404 will enable fully or in part or disable functions depending on the settings.

Note that some or all of the modules in the charging station 202, namely the communication module 412, the frequency processing module 400, the control module 404 and the user interface module 422 can be implemented in hardware, software or a combination of hardware and software.

Figure 25:
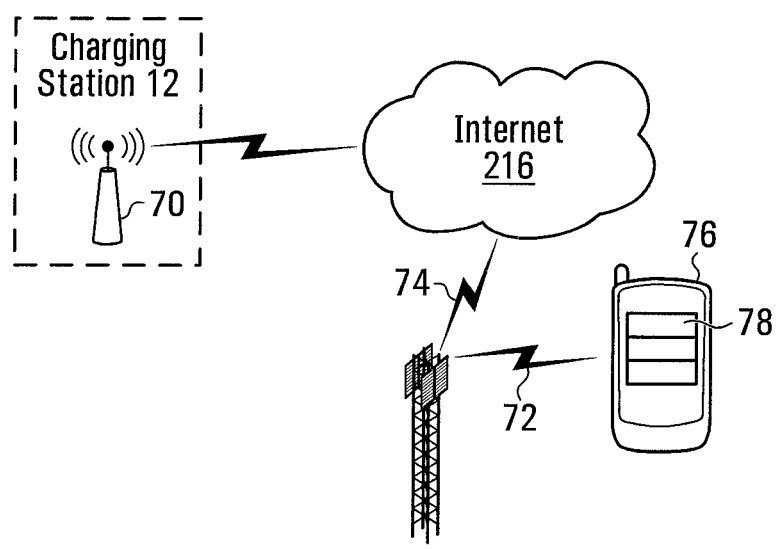
FIG. 25 is a diagram of a communications network allowing sending information to a smart phone of a user about interactions between the electric vehicle of the user and AC power distribution network.

With reference to FIG. 25, the parameters of the charging station 202, can be remotely set over a smart phone 76 that can communicate over the Internet 216 with the charging station 202 or a proxy thereof. In the example shown, the communication module 412 implements a web interface that communicates via the wireless access point 450 with the Internet 216. The smart phone 76 of the user also connects to the Internet 216 via a cellular connection 72, which in turn connects to the Internet 216 via a communication link 74. By this arrangement, the charging station 202 can exchange messages with the smart phone 76.

The smart phone 76 runs an application that has a user interface which could be identical to the one shown at FIG. 24, providing the user with controls which enable setting the relevant parameters 424, 426 and 428. In addition, the application allows the smart phone 76 to receive messages providing status information to the user about the interaction between the electrical vehicle 204 and the AC power distribution network 200. In one example of implementation, those status messages can be sent as text messages 78. The status information that can be sent includes the following:

1. An event has occurred, such as an under-frequency and the electric vehicle 204 is currently supplying electrical power to the AC power distribution network;
2. The rate at which electrical power is being supplied;
3. Whether the supplemental energy source, such as the ICE or fuel cell has been started for power generation;
4. End of power draw from the electric vehicle;
5. Total time during which the electric vehicle supplied electric power to the AC power distribution network and the amount of electric power so supplied;
6. Monetary credit applied to the electric utility bill of the user, if any.

The status information can be generated at least in part by the charging station 202 since the charging station 202 is at the interface between the AC power distribution network 200 and the electric vehicle 204. In this embodiment, the status information is assembled by the control module 404 and sent via the communication module 412 to the smart phone 76. Alternatively, the status information can be sent from the charging station 202 to the server arrangement 206 for processing, and the server 206 sends then the information to the smart phone 78 of the user, which includes additional information such as credit information which is generated by the server 206 processing.

Figure 21:
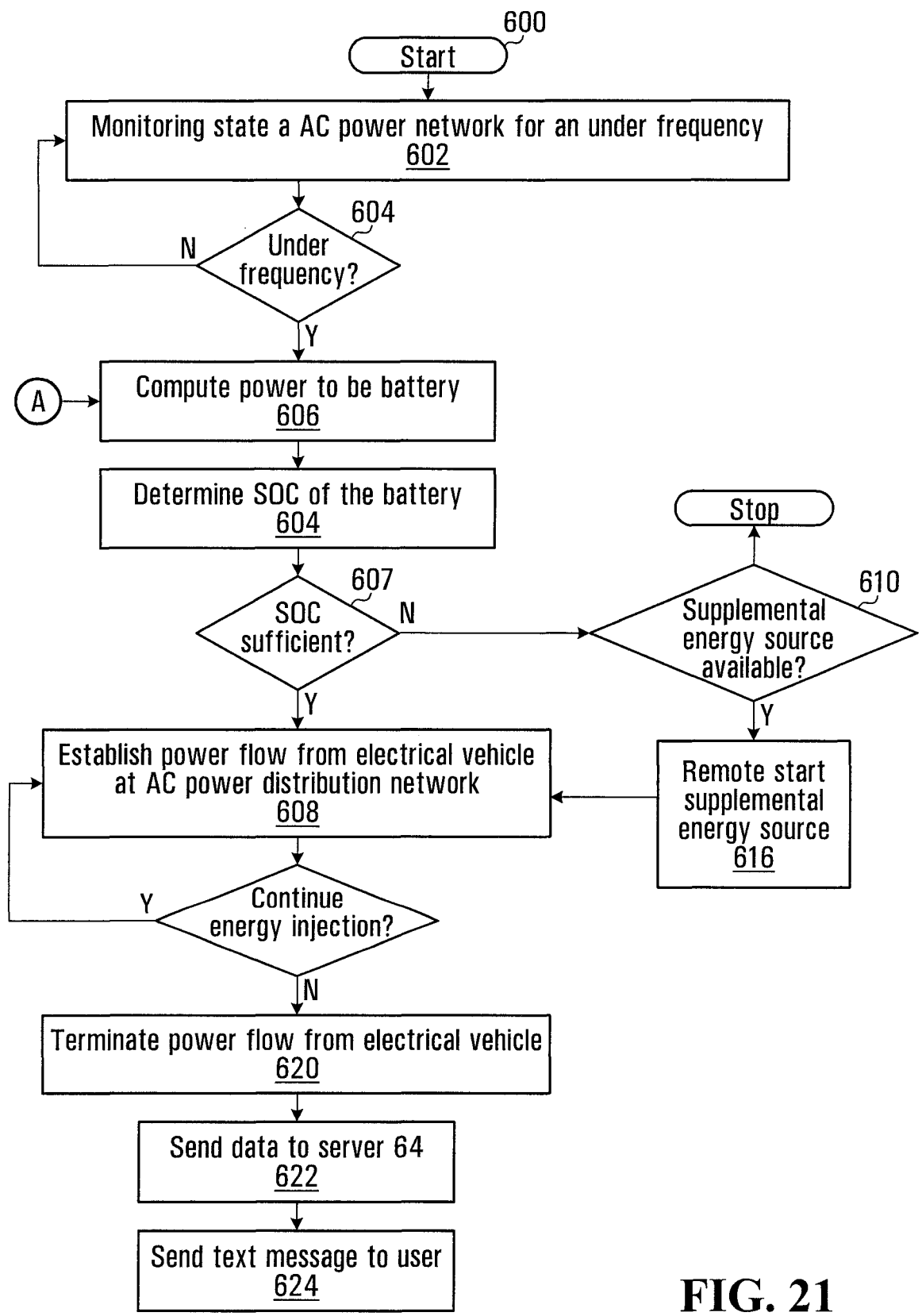
FIG. 21 is a flowchart illustrating the steps of a process for regulating the supply of electrical power from the battery and/or a supplemental energy source of an electric vehicle to the AC power distribution network.

FIG. 21 is a flowchart, which illustrates in greater detail the steps of the interaction between the electric vehicle 204 and the AC power distribution network 200.

The process starts at 600. At step 602 the charging station 202 monitors the state of the AC power distribution network 200 for an under frequency event.

Step 604 is a decision step. If an under frequency is detected it proceeds toward step 606, otherwise it loops back to step 602.

Step 602 computes the needs of the AC power distribution network on the basis of the frequency information and derives the rate at which electrical power is to be injected back into the AC power distribution network 200. The rate can be a number of kWh of electricity that need to be supplied to support the AC power distribution network 200.

At step 604 the control module 404 determines the State of Charge (SOC) of the battery of the electric vehicle 204 to determine if the battery can supply the required power into the AC power distribution network 200. The SOC information is obtained by communicating with the vehicle over the communication path 406.

At step 607, which is a decision step, the process determines if the SOC is sufficient to meet the demand. The SOC will be sufficient in most cases, since an under frequency event is usually of short duration, typically minutes. The SOC will not be sufficient if the battery is completely discharged or the power demand is such that the battery can only provide a fraction of it.

If the SOC is sufficient, the processing continues at step 608, where the control module 404 negotiates with the electric vehicle 204 to start the back flow of power to the AC power distribution network 200, including also sending control signals to the inverter 430 such that the AC power is injected at the desired rate in the network 200 and in proper phase.

The process then continuously loops back to step 602.

If the decision step 607 is answered negatively, the process continues with step 610, which is yet another decision step to determine if a supplemental energy source is available for power generation. The supplemental energy source would not be available if it does not exist, in other words the vehicle is a BEV, or if its use has been disabled in the settings.

If the supplemental energy source is available and the decision step 610 is answered positively, the control module 404 sends signals to the electric vehicle 204 over the communication path 406 to remote start the supplemental energy source, as shown at step 616. The process then proceeds to step 608.

If step 610 is answered negatively, the control module 404 will then stop the processing since no electrical energy is available that can be provided to the AC power distribution network.

An alternative point of entry into the process is represented by the letter A in a circle. That entry point represents the situation where an explicit command is sent to the charging station 212 from another entity, such as the server arrangement 206. In this case, the command is received by the communication module 412, decoded if necessary and sent to the control module 404 for implementation.

When the under-frequency event is resolved, which is reflected by a negative answer to the decision step 618, the control module 44 terminates the power injection in the AC power distribution network 200 at step 620, and generates summary usage data at step 622. At step 624 the server arrangement 206 processes the data and generates a text message to the user.

Another condition that will result into the decision step 618 to be answered in the negative is that certain time limits, such as those set in parameters or sent to the charging station 202 by the server arrangement 16, have expired.

Referring back to FIG. 28, a possible variant is to locate at least some of the components shown in the block diagram in the vehicle 204. This variant is shown by the block diagram at FIG. 23. All the components are now located in the electric vehicle 204, with the exception of the charging module 408 which essentially acts as a pass-through when electric power back flows from the battery to the AC power distribution network 200.

FIG. 18 is high level block diagram illustrating multiple AC power distribution networks 300, 302, 304 and 306 and a server arrangement 308 for managing roaming services. As in the case of the server arrangement 206, the server arrangement 308 may include a single server device or multiple server devices that are clustered together or installed at remote locations and communicating with each other over communication links.

Also note that in practice, the AC power distribution networks 300-306 are unlikely to be independent, in the sense they interconnect with each such that electric power can be exchanged between networks. Typically, the AC power distribution networks 300-306 are operated, managed and owned by different service providers. Each provider can be a public utility company that operates the AC power distribution network to deliver electricity to clients. Thus, each service provider maintains an accounting system that is separate from the accounting system of another service provider, however those accounting systems communicate with each other such as to be able to make financial adjustments when a user that has an account with one service provider user the services of the AC power distribution network of a different service provider or provides services to that AC power distribution network.

The server arrangement 308 is an entity that maintains certain information relative to user accounts allowing managing credits and debits with roaming users in other words users that connect to an AC power distribution network 300-306 operated by a service provider with which they have no business relationship, in other words they have no account with that service provider.

Figure 29:
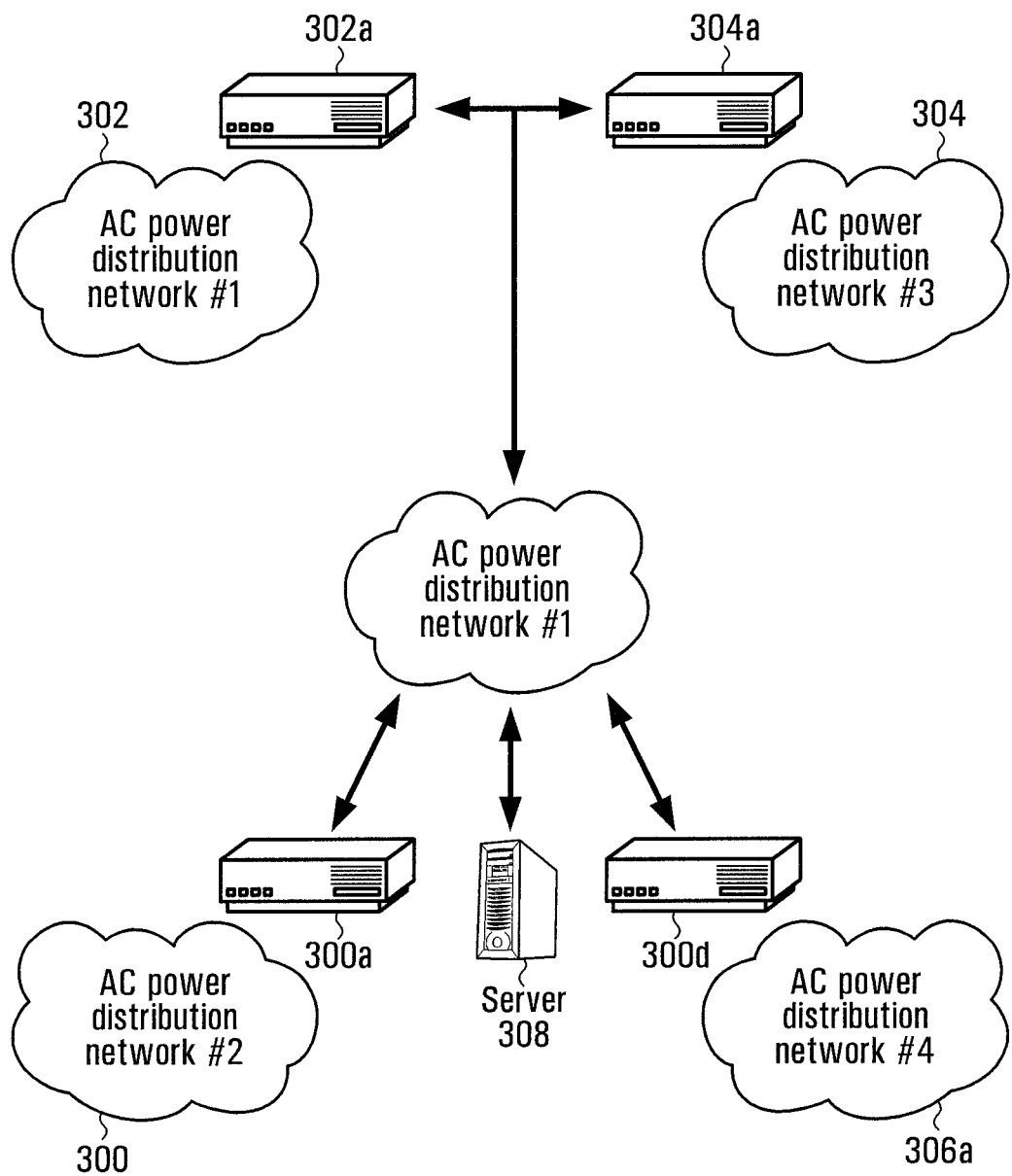
FIG. 29 is a block diagram of a communication infrastructure between multiple AC power distribution networks, such as those shown at FIG. 18.

FIG. 29 illustrates in greater detail the data network for managing the accounting that service providers conduct for performing billing operations for electricity supply services. The data network includes server arrangements 300a, 302a, 304a and 306a, associated with AC power distribution networks 300-306, respectively. Server arrangements 300a-306a are connected to the Internet 216 or through any other data communication infrastructure. Server arrangement 308 also connects to the Internet 216. While the server arrangement 308 has been shown as being separate from the server arrangements 300a-306a, it is possible to integrate the functionality of the server arrangement 308 into anyone of the server arrangements 300a-306a.

Each server arrangement 300a-306a maintains a list of accounts. Those accounts are associated with respective clients of the service provider that get billed for electricity services. The server arrangement 308 contains a data structure mapping the electrical vehicle 204/battery identifiers with client accounts. In this fashion, when an electric vehicle uses services from or provides services to an AC power distribution network 300-302 other than the one with which the owner of the vehicle or the owner of battery of the vehicle, if it is different from the owner of the electric vehicle 204, has an account, billing for the service used or credit for the service provided can be properly made.

FIG. 19 illustrates the structure of a table 500 that resides in the memory of the server arrangement 308 which maps vehicle identifiers with respective accounts. Typically, the list of vehicle identifiers would include all or most of the electric vehicles 204 likely to connect to anyone of the AC power distribution networks 300-302. The vehicle identifiers in the table 500 are any strings of alphanumeric characters that allow distinguishing one vehicle from another. Each identifier is mapped to a corresponding account to which financial transactions associated with this vehicle are conducted. Note that the identifiers in the table 500 can be associated with batteries, not only vehicles. Since the battery of an electric vehicle 204 can be swapped out of the vehicle or can be owned by an entity other than the vehicle owner, it can be considered from a transaction perspective as being an entity separate from the vehicle 204.

Figure 22:
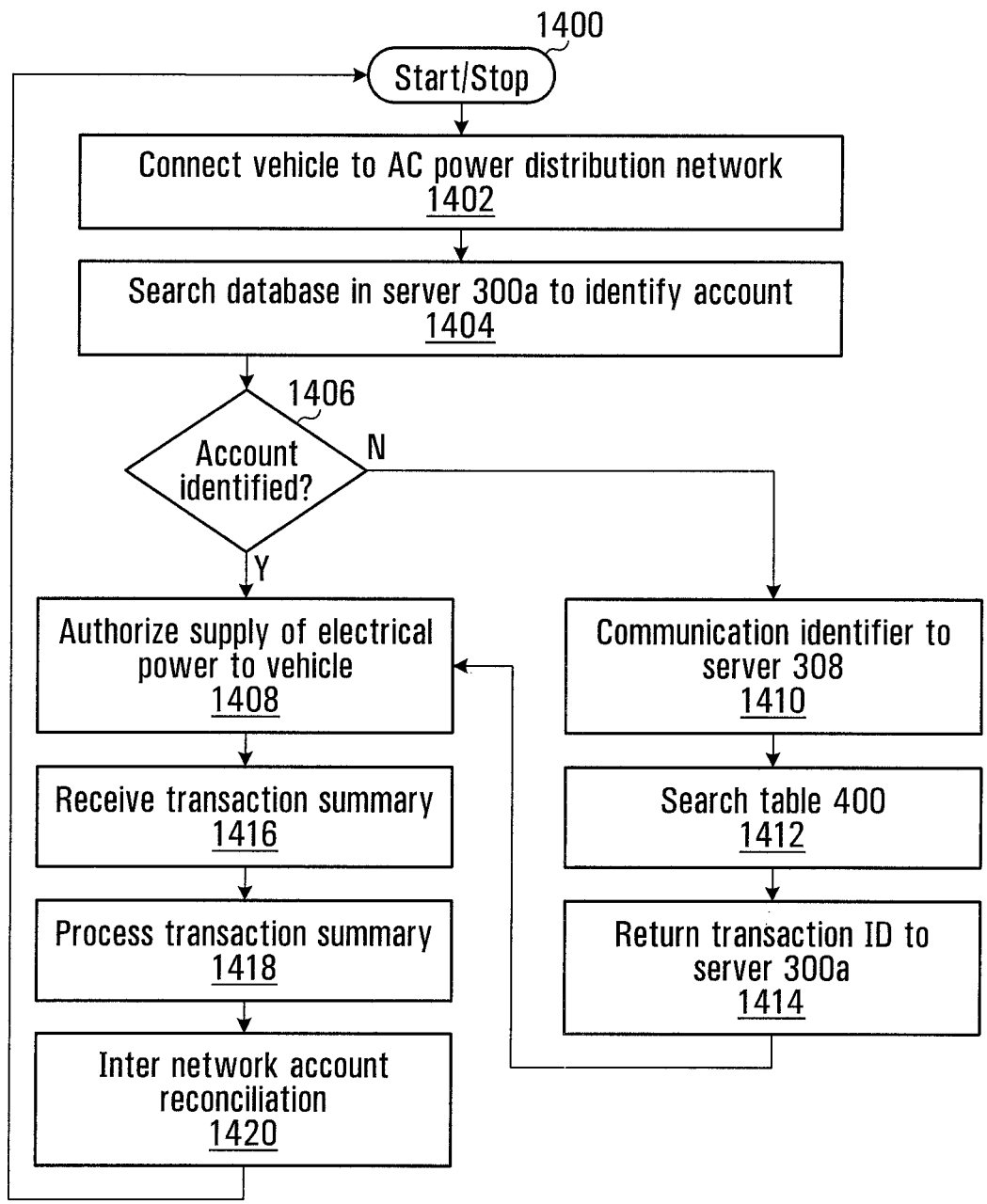
FIG. 22 is a flowchart of a process performed by the servers shown in FIG. 18 and FIG. 29.

FIG. 22 is a flowchart that illustrates the operation of the system shown in FIGS. 18, 19 and 29.

The process starts at 1400. At step 1402 the owner of the electric vehicle 204 connects the electric vehicle to AC power distribution network 300 to a public charger for charging. A negotiation is performed between the vehicle 204 and the server 300a to authorize the transaction and enable the supply of electricity to the electric vehicle 204. Alternatively, the negotiation can be performed between the public charger and the server 300a. In such case, the public charger, upon connection to the electric vehicle 204 obtains from the vehicle the identifier and passes this identifier to the server arrangement 300a.

The negotiation, whether between the vehicle 204 or the public charger is made by exchanging messages with the server arrangement 300a via the Internet 216. The messages can be sent over communication links that are either wireless or wire line.

At step 1404, the server arrangement 300a receives the identifier and performs a search to identify the account associated with that identifier for billing purposes.

Step 1406 is a decision step. If the identifier is located in the database of server 300a, in other words the owner of the vehicle 204 has an account with the public utility that that manages and operates the AC power distribution network 300, the server 300a proceeds to step 1408 to authorize the transaction and electricity is supplied to the electric vehicle 204.

However, if decision step 1406 is answered negatively, in other words the vehicle owner has no account with the public utility managing and operating the AC power distribution network 300, the server arrangement 300a proceeds to step 1410. More specifically, the server arrangement 300a sends the identifier to the server arrangement 308, which searches the table 400 to determine if this identifier has an account with anyone of the other AC power distribution networks 302, 304 and 306.

Assume for the sake of this example, that the vehicle owner has an account with the AC power distribution network 306. At step 1412 the search extracts from the table 400 the relevant information, namely the information necessary to identify the account maintained at the AC power distribution network 306 and sends that information to the server arrangement 300*a*. Note that for privacy purposes, the exchange of information performed may be designed in a way to avoid sending personal information, such as the name of the account holder, address or other confidential information. This can be accomplished by creating at the server arrangement 308 a transaction identifier that uniquely identifies the transaction that is being performed between the public utility of AC power distribution network 300 and the vehicle owner. The transaction identifier is sent at step 1414 back to the server arrangement 300*a* with an acknowledgment that a valid account associated with the vehicle identifier exists.

Processing then proceeds to step 1408 where the public charger is authorized to supply electrical power to the vehicle 204 for charging.

When the charging session is completed, the public charging station or the electric vehicle 204 communicates again with the server arrangement 300*a* to send to the server arrangement 300*a* the transaction summary, as shown at step 1416. The transaction summary contains information such as:

1. Electrical draw from the AC power distribution network 300, in terms of kWh consumed.
2. Electrical power supplied to the AC power distribution network, if any. For example, in the case of an under-frequency event or if specifically requested by the AC power distribution network 300, electrical power is supplied from the electric vehicle. The summary information indicates how much electricity was input into the AC power distribution network and the source thereof, namely battery and/or supplemental energy source.
3. Connection time to the public charger.

The transaction summary is received and processed at the server arrangement 300*a*, as shown at step 1418. If the vehicle owner has an account with the AC power distribution network 300, the processing includes computing a charge for the electric draw and a credit for the electrical power supplied to the AC power distribution network 300 and posting the charge and credit if any to the account of the vehicle owner.

On the other hand, if the vehicle owner has no account with the AC power distribution network 300, the server arrangement 300*a* sends the transaction summary along with the previously generated transaction ID to the server 308, which matches it with the previous search request (step 1412) and sends the transaction summary to the public utility of AC power distribution network 306, holding the account associated with the vehicle identifier. the server 300*d* will then compute charges and credits and post them to the account of the user.

Final step 1420 is optional and occurs when the charge/credit is posted to an account associated with an external AC power distribution network, in other words a network other than the one that supplies or receives the electrical energy. This step is an inter network account reconciliation to compensate the public utility of AC power distribution network 300 by the public utility of AC power distribution network 306 for the payment/debit involved when the vehicle owner settles its account with the public utility of AC power distribution network 306.

In a possible variant, this roaming arrangement allowing electric vehicles to charge and also to obtain credit for supporting the AC power distribution network 200 is implemented by an entity other than the operator of the AC power distribution network. The server arrangements 300*a*-306*a* and the server arrangement 308 are associated by business entities that provide automotive charging services and own the individual vehicle charger installations. For instance server 300*a* is associated with charging service provider #1, server 302*a* is associated with charging service provider #2, server 304*a* is associated with charging service provider #3 and server 306*a* is associated with charging service provider #4.

Each service provider purchases its electricity from an AC power distribution network and pays the operator accordingly. The operator also credits the service provider for any energy injection to the AC power distribution network from chargers that are connected to the AC power distribution network.

When the owner of an electric vehicle 204, which has an account with charging service provider #1 uses the charging services of that service provider, all financial transactions are local to the charging service provider #1. The vehicle owner will pay the charging service provider #1 for the cost of charging and will receive a credit from the charging service provider #1 for any back flow of electricity to the AC power distribution network. However when the owner of the electric vehicle uses charging services/provides AC power distribution network support through a charging station that is owned and operated by a different service provider, than the roaming process described above takes place. When the vehicle connects to the charging station, the local service provider will not find an account and a query will be made with server 308 to identify the service provider with which the electric vehicle has an account. The vehicle will then be allowed to charge and support the AC power distribution network and once the process is completed, the accounting will be performed including an inter-service provider reconciliation such that the local service provider is compensated and the charge is carried over to the account of the owner with the service provider #1.

Another possible refinement that can be considered in the context of the present disclosure is to provide an accounting system to the electric vehicle 204 or battery (when the latter is being leased rather than being purchased as a component part of the vehicle) to be able to distinguish between usage related to vehicle propulsion and usage related to supporting the AC power distribution network or the supply of electrical energy to a dwelling in the case of power failure. This usage accounting system is useful for battery warranty.

Automobile manufacturers that offer electric vehicles provide a warranty on the battery. The intent of the warranty on the battery is to guarantee the owner a minimal level of battery performance passed over a warranty period. When the electrical vehicle is used for supporting the AC power distribution network or to supply a dwelling with electrical energy, the usage of the battery is no longer restricted to propulsion of the vehicle, which may void the warranty on the battery. An accounting system that can distinguish between propulsion usage and ancillary usages, such as supporting the AC power distribution network or powering a dwelling would make it possible for automobile manufacturers to still provide a meaningful warranty as long as the ancillary usage is controlled. In other words, as long as the electric vehicle is in its warranty period (expressed in terms of time or distance travelled) and the ancillary usage is within a predetermined limit, then the warranty continues to apply.

Figure 23:
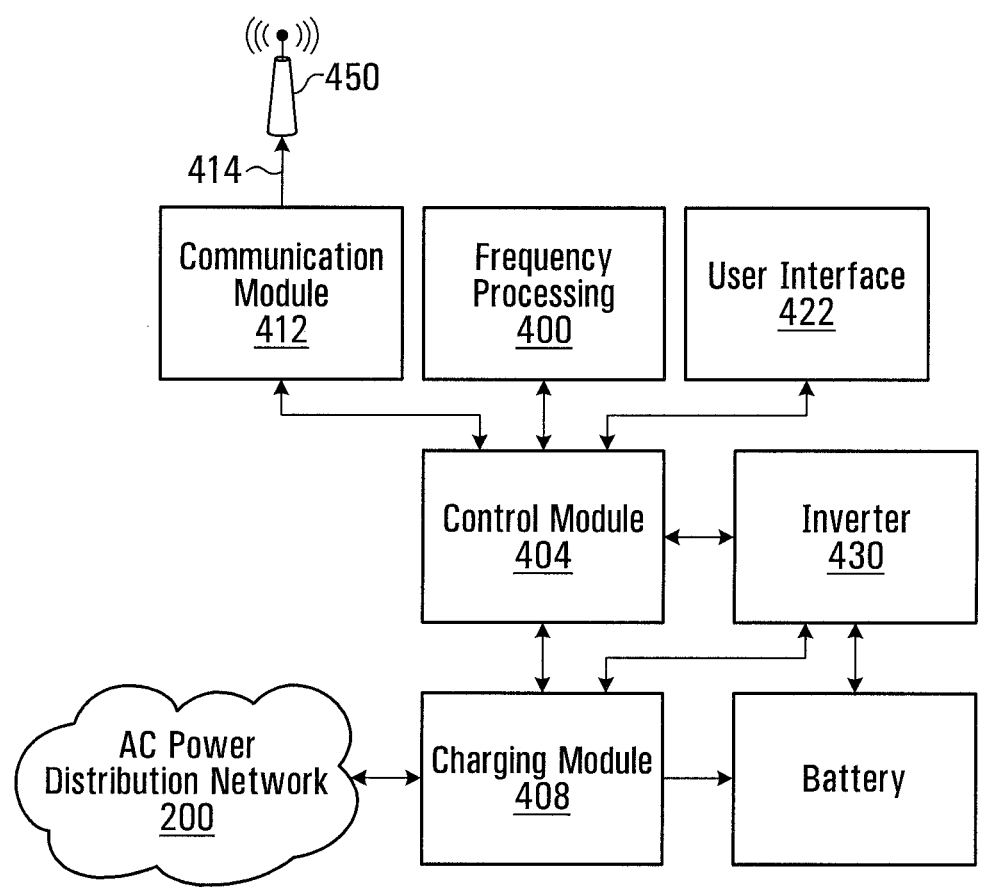
FIG. 23 is a block diagram of sub-system of an electric vehicle for regulating the energy injection in the AC power distribution network.
Figure 30:
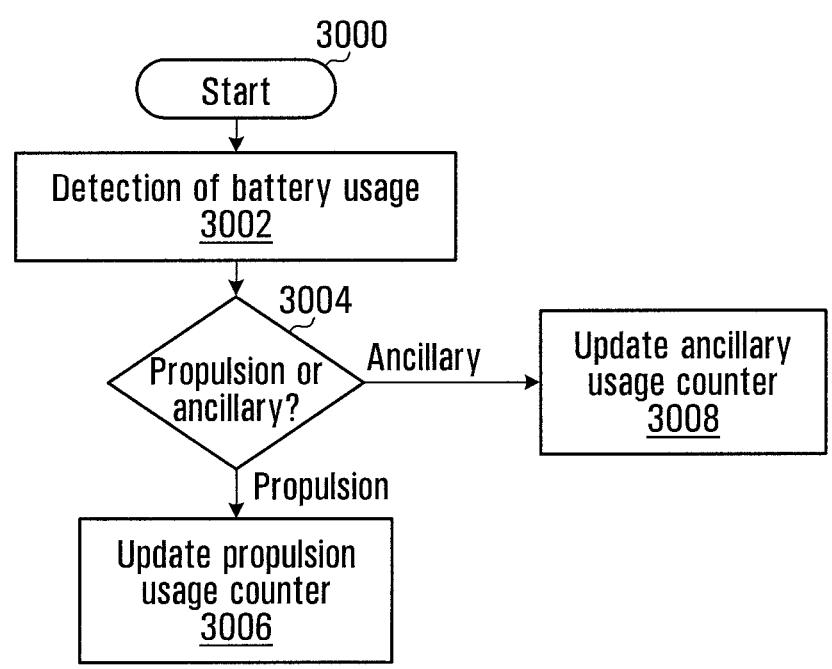
FIG. 30 is a flowchart of a process performed by the system shown in FIG. 23 to perform an accounting of propulsion usage and ancillary usage.

Such an accounting system can be implemented by software on the platform shown at FIG. 23. The control module 404 executes the software that implements the usage accounting logic. That logic will be described in detail in the flowchart of FIG. 30.

The process starts at 3000. At process step 3002 the controller module 404 detects that the battery is being used. Such detection can be made by sensing the current flow at the battery, if there is current flow above a certain threshold, then the controller module 404 detects usage. At decision step 3004, the controller module 404 determines if the battery is being used for propulsion or for ancillary usage. There are number of possible ways for the controller module 404 to distinguish between the usage types. A simple one is to sense current or voltage at the drive motor of the vehicle; if current/voltage is present then the vehicle is being driven which means that the battery is being used for propulsion. Accordingly, if there is current flow at the battery but there is not sufficient current/voltage at the drive motor, the conclusion is that the battery is being used for ancillary purposes.

Another possible way to distinguish between usage types, is to tie the decision step 3004 to the transactions occurring when the electric vehicle is supplying electrical energy through the charging module 408; any backflow of electrical energy through the charging module 408 indicates ancillary usage.

If the decision step 3004 determines that the usage of the battery is for propulsion, then the processing branches to step 3006, where a counter is updated. The counter can keep track of vehicle millage for example. Another option is the number of charge and/or discharge cycles of the battery. Another possibility is the number of KWh supplied.

Alternatively, if decision step 3004 determines that the usage of the battery is ancillary usage, then the counter at step 3008 is updated. The counter can keep track of the usage by recording the number of charge/discharge cycles of KWh supplied by the battery.

Both counters are non-volatile and retain the information stored indefinitely. This way the automobile manufacturer can check the usage to determine if the warranty coverage is still available.

Optionally, the processes shown in FIGS. 5, 14 and 21 can be modified to include a number of control steps to avoid unintentionally voiding the warranty on the battery and also damaging the battery when operating it in conditions that may be detrimental to its durability.

One of the control steps is to read the ancillary usage counter to determine if the ancillary usage so far is closer to the limit at which the warranty may be voided. If the usage is close to the threshold level then a number of options are possible. One of those options is to prevent any further ancillary usage. In this case, the battery is reserved strictly for propulsion.

Another option is to notify the owner of the vehicle that the ancillary usage limit is near such that the owner can take steps, if he/she wishes to do so, to avoid the usage limit to be exceeded. One of those steps is to change the settings to prevent the electric vehicle to feed a dwelling or support the AC power distribution network. The notification can be provided to the owner via the smart phone application or via the user interface 422. Optionally, the controller module 404 can be designed such that once the ancillary usage limit has been reached, the setting 424 is automatically switched to "no" and a message is displayed indicating to the user that the ancillary usage limit has been reached.

Another control step is to measure the outside temperature and allow the battery to feed the AC power distribution network only when the battery is within its operational temperature range. A battery that is operated in extreme temperatures, cold or hot, can be damaged. The control step thus measures the outside temperature and prevents the battery to feed the AC power distribution network of the dwelling, when the temperature is outside the preset range.

The invention claimed is:

1. A method for allocating credits for injection of electricity into an AC power distribution network from electrical vehicles connected to the AC power distribution network, the AC power distribution network being characterized by a dynamic state of balance between power generation and load, the electrical vehicles being enabled to supply electricity to the AC power distribution network in response to detection that the AC power distribution network is in a state of imbalance resulting from a power generation deficit, the state of imbalance being characterized by a frequency deviation from a nominal frequency of the AC power, the method comprising:
   a. detecting connections of electrical vehicles to the AC power distribution network through which electricity is supplied to the electrical vehicles for recharging;
   b. identifying for the electrical vehicles at the detected connections, user accounts;
   c. computing a credit for the individual electrical vehicles at the detected connections for the supply of electricity to the AC power distribution network occurring in response to detection that the AC power distribution network is in a state of imbalance resulting from a power generation deficit, wherein the supply of electricity is characterized by a degree of power injection to the AC power distribution network, the degree of power injection being determined based on the magnitude of the frequency deviation from the nominal frequency;
   d. posting the credits to the respective user account;
   e. for a particular one of the electrical vehicles detecting multiple connections to the AC power distribution network occurring at different geographical locations and at different times;
   f. identifying at each one of the multiple connections the user account associated with the particular one of the electrical vehicles;
   g. for each connection of the multiple connections computing a credit for the particular one of the electrical vehicles when the particular one of the electrical vehicles supplies electricity to the AC power distribution network;
   h. accumulating the credits associated with the multiple connections in the account of the particular one of the electrical vehicles.

2. The method of claim 1, including providing a database mapping user accounts with electrical vehicle identifiers and further including receiving signals conveying identifiers of electrical vehicles at the detected connections and searching the database to identify the user accounts associated with the identifiers conveyed by the signals.

3. The method of claim 2, wherein the signals conveying the electrical vehicle identifiers are sent by the electrical vehicles.

4. The method of claim 2, wherein the signals conveying the electrical vehicle identifiers are sent by charging stations to which the electrical vehicles are connected.

5. The method of claim 4, including communicating the identifiers of the electrical vehicles to the respective charging stations to enable the charging stations to send the signals.

* * * * *